(12) United States Patent
Jung et al.

(10) Patent No.: US 11,598,476 B2
(45) Date of Patent: Mar. 7, 2023

(54) VACUUM ADIABATIC BODY AND REFRIGERATOR

(71) Applicant: LG ELECTRONICS INC., Seoul (KR)

(72) Inventors: Wonyeong Jung, Seoul (KR); Deokhyun Youn, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 16/977,583

(22) PCT Filed: Jun. 26, 2019

(86) PCT No.: PCT/KR2019/007763
§ 371 (c)(1),
(2) Date: Sep. 2, 2020

(87) PCT Pub. No.: WO2020/004955
PCT Pub. Date: Jan. 2, 2020

(65) Prior Publication Data
US 2020/0408351 A1   Dec. 31, 2020

(30) Foreign Application Priority Data

Jun. 27, 2018  (KR) ........................ 10-2018-0074280

(51) Int. Cl.
*F25D 19/00*       (2006.01)
*F16L 59/065*      (2006.01)
(Continued)

(52) U.S. Cl.
CPC ............ *F16L 59/065* (2013.01); *F25D 19/00* (2013.01); *F25D 23/006* (2013.01);
(Continued)

(58) Field of Classification Search
CPC ...... F25D 23/061; F25D 19/00; F25D 23/067; F25D 23/087; F25D 2201/14; F25B 2400/054
See application file for complete search history.

(56) References Cited

U.S. PATENT DOCUMENTS 4,498,046 A * 2/1985 Faris .................. G01R 31/2822
324/750.28
7,007,496 B2   3/2006 Kim et al.
(Continued)

FOREIGN PATENT DOCUMENTS

CN   104180595    12/2014
CN   107923698    4/2018
(Continued)

OTHER PUBLICATIONS

International Search Report and Written Opinion dated Oct. 8, 2019 issued in Application No. PCT/KR2019/007763.
(Continued)

*Primary Examiner* — Brian M King
(74) *Attorney, Agent, or Firm* — KED & Associates, LLP

(57) ABSTRACT

A vacuum adiabatic body includes a heat exchange pipeline and a sealing plug. The heat exchange pipeline includes at least two pipelines which pass through a first plate and a second plate to allow a refrigerant to move between inner and outer spaces. The sealing plug allows the heat exchange pipeline to pass through a first point of the first plate and a second point of the second plate without contacting a third space.

24 Claims, 31 Drawing Sheets

(51) Int. Cl.
*F25D 23/00* (2006.01)
*F25D 23/06* (2006.01)
*F25D 23/08* (2006.01)

(52) U.S. Cl.
CPC ......... *F25D 23/061* (2013.01); *F25D 23/067* (2013.01); *F25D 23/087* (2013.01); *F25D 2201/14* (2013.01)

(56) References Cited

U.S. PATENT DOCUMENTS

| | | |
|---|---|---|
| 2005/0175809 A1 | 8/2005 | Hirai et al. |
| 2006/0266075 A1* | 11/2006 | Itsuki ..................... F25B 40/00 62/512 |
| 2013/0111942 A1 | 5/2013 | Jung |
| 2014/0116083 A1* | 5/2014 | Chung ..................... F25C 1/00 62/340 |
| 2014/0346942 A1 | 11/2014 | Kim et al. |
| 2015/0030800 A1 | 1/2015 | Jung et al. |
| 2016/0084568 A1 | 3/2016 | Jung et al. |
| 2016/0290690 A1 | 10/2016 | Jung et al. |
| 2018/0224193 A1 | 8/2018 | Jung et al. |
| 2018/0224195 A1 | 8/2018 | Jung et al. |
| 2018/0238610 A1 | 8/2018 | Jung et al. |

FOREIGN PATENT DOCUMENTS

| | | |
|---|---|---|
| CN | 207247683 | 4/2018 |
| JP | H11-130161 | 5/1999 |
| JP | 2012-087993 | 5/2012 |
| KR | 20-1998-020939 | 7/1998 |
| KR | 20-0158720 | 10/1999 |
| KR | 10-0343719 | 6/2002 |
| KR | 10-2013-0049495 | 5/2013 |
| KR | 10-2015-0012712 | 2/2015 |
| KR | 10-2019-0070753 | 6/2019 |
| WO | WO 2017/023095 | 2/2017 |

OTHER PUBLICATIONS

Australian Examination Report dated Jun. 25, 2021 issued in Application No. 2019292297.
Chinese Office Action dated Jul. 27, 2021 issued in Application No. 201980023734.2.
European Search Report issued in Application No. 19824731.4 dated Feb. 8, 2022.

* cited by examiner

[Fig. 1]
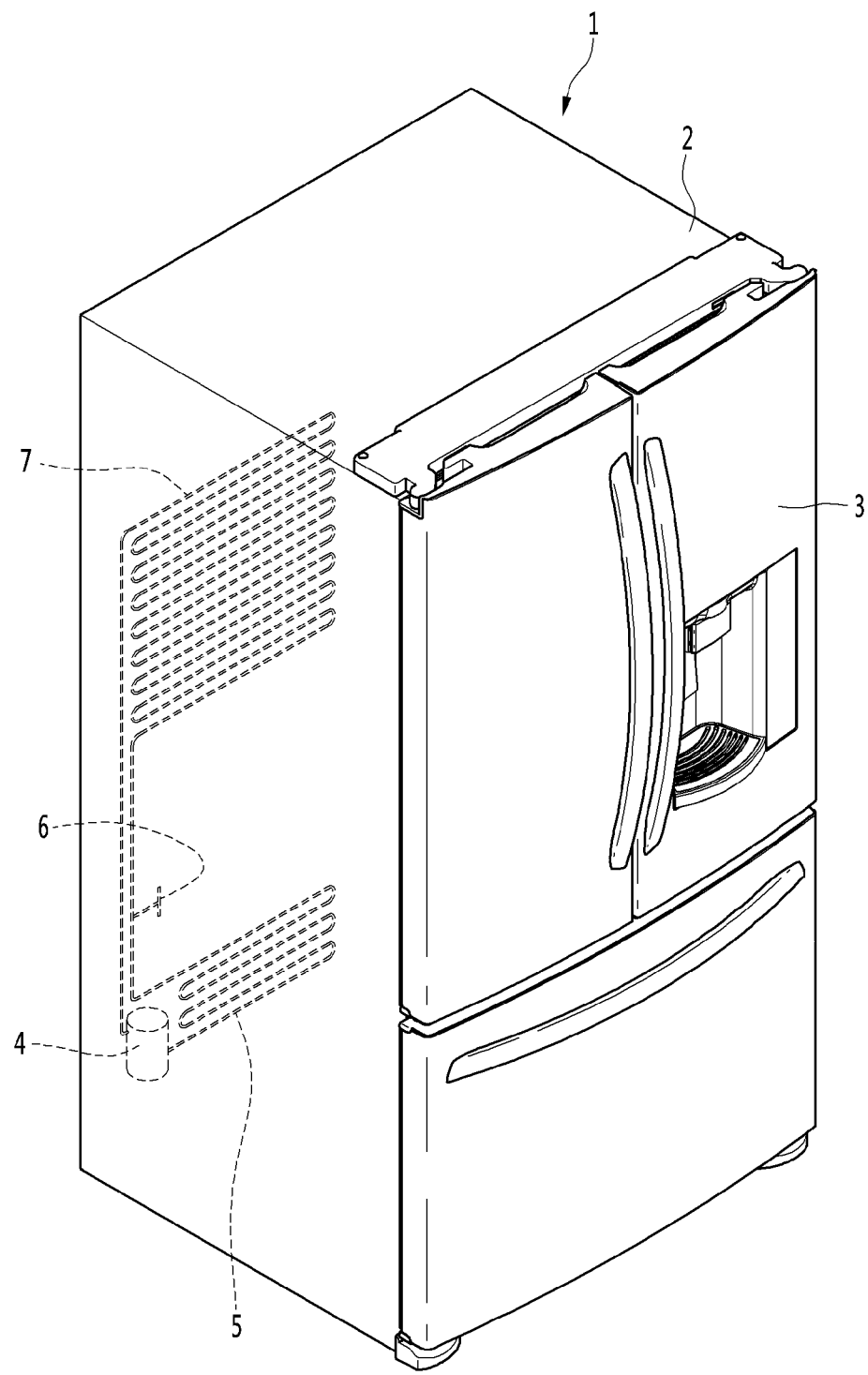

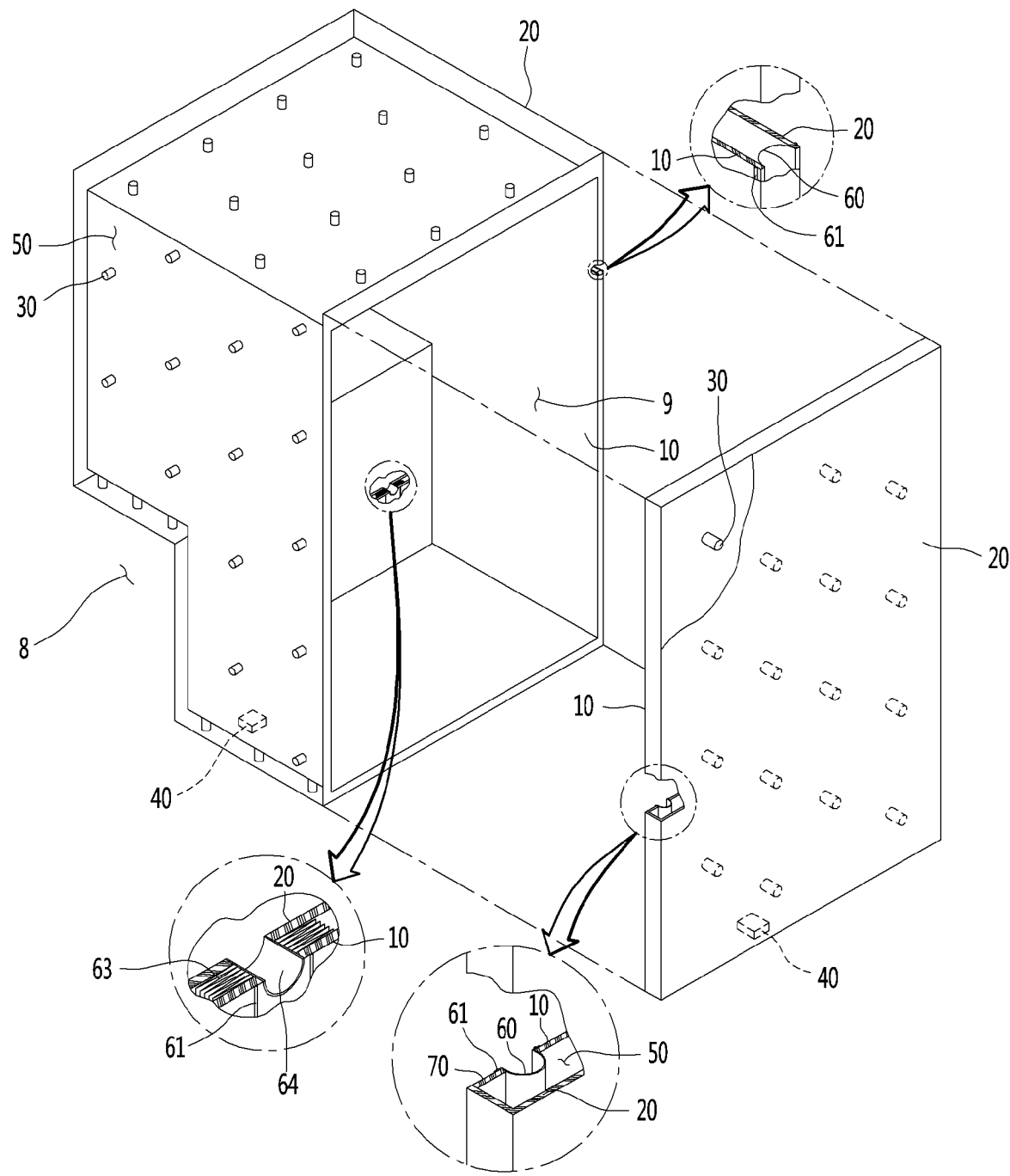
[Fig. 2]

FIG. 4

| Group | | General plastic | | | | Engineering plastic | | | |
|---|---|---|---|---|---|---|---|---|---|
| Material | | (HD)PE ✻G-Plastic Reference | PC | Glass fiber PC (30% Glass-F) | ✻Low outgassing PC | PCTFE | PPS | LCP | PEEK |
| Out-gassing rate | TML(%) | 0.58 | 0.19 | 0.14 | No Data | 0.01 | 0.06 | 0.06 | 0.26 |
| Compressive Strength | MPa | 31.7 | 82.8 | 124.1 | *80.6 | 37.9 | 107.0 | * 151.1 | 137.9 |
| Thermal Conductivity | W/m-k | <0.40 | 0.18 | 0.18 | 0.18 | 0.20 | 0.3 | 0.36 (G/F 50%) | 0.25 |
| Strength /Cond. | MPa·m-k/W | 79 | 460 | 689 | 448 | 189 | 357 | 420 | 552 |
| Heat Deflection Temp at 264 psi | °C | 80 | 132 | 146 | 125 | 126 | 121 | 105 ~ 260 | 160 |
| Max Operating Temperature | °C | 82 | 121 | 132 | No Data | 132 | 218 | No Data | 249 |
| *Cost(per 1kg) | | Low | $3.1 | $6.2(G/F20%) | $6.7 | High | $30 | $40 | $150 |

[Fig. 5]
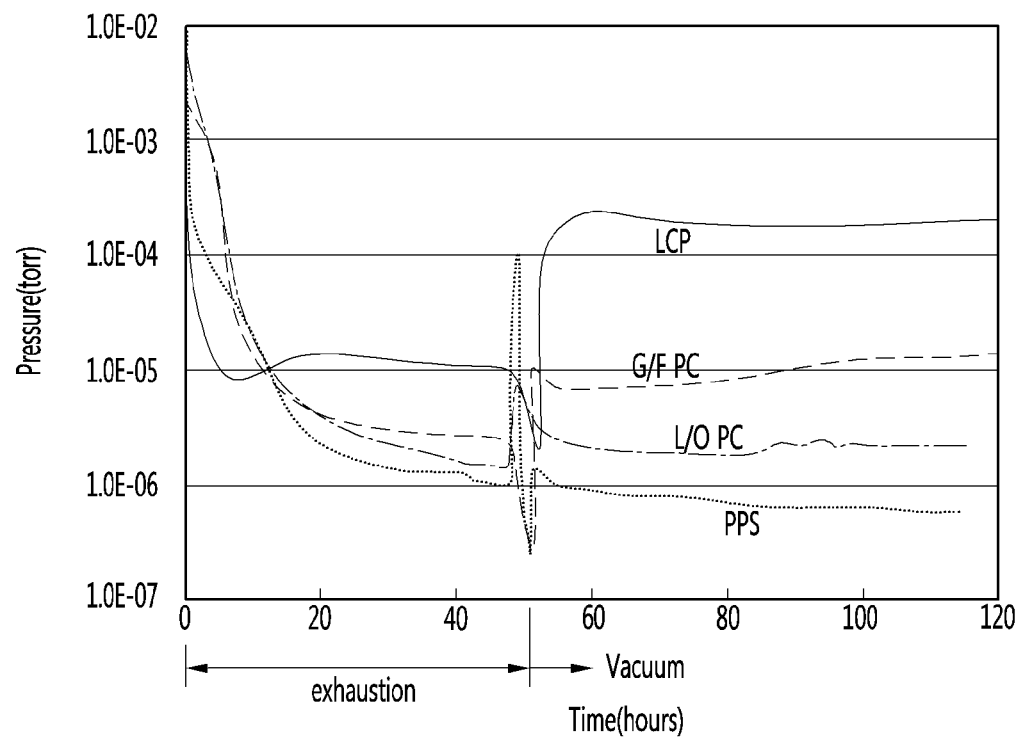

[Fig. 7]
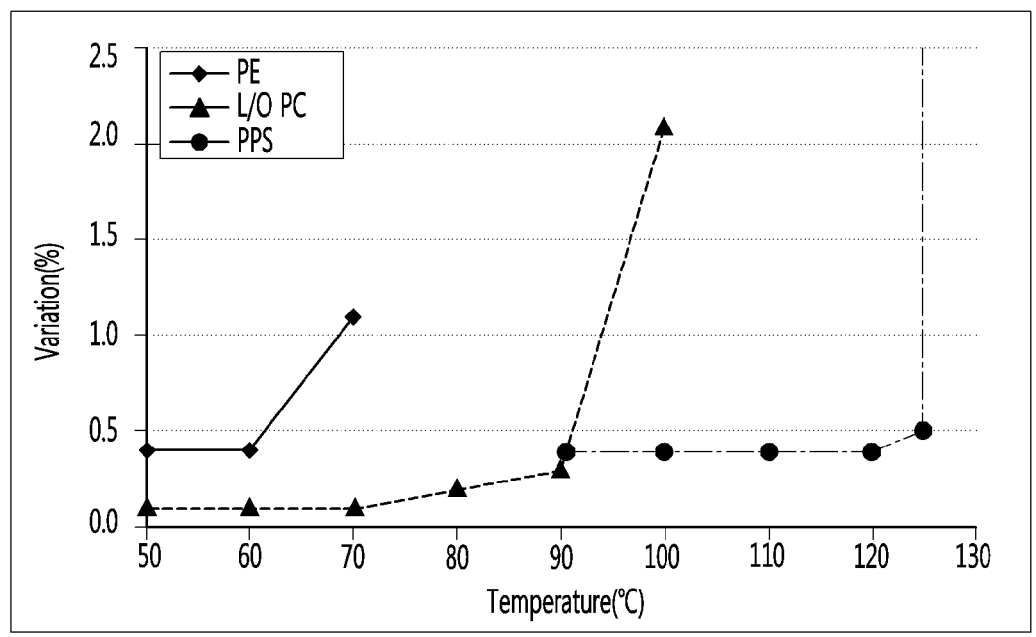

[Fig. 9]
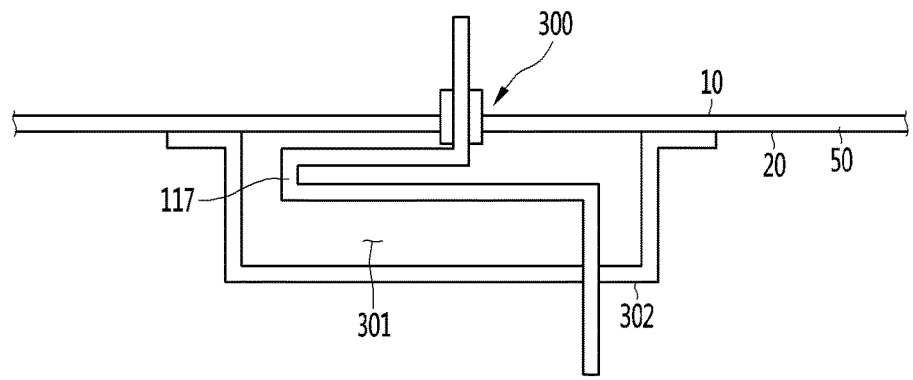
[Fig. 10]
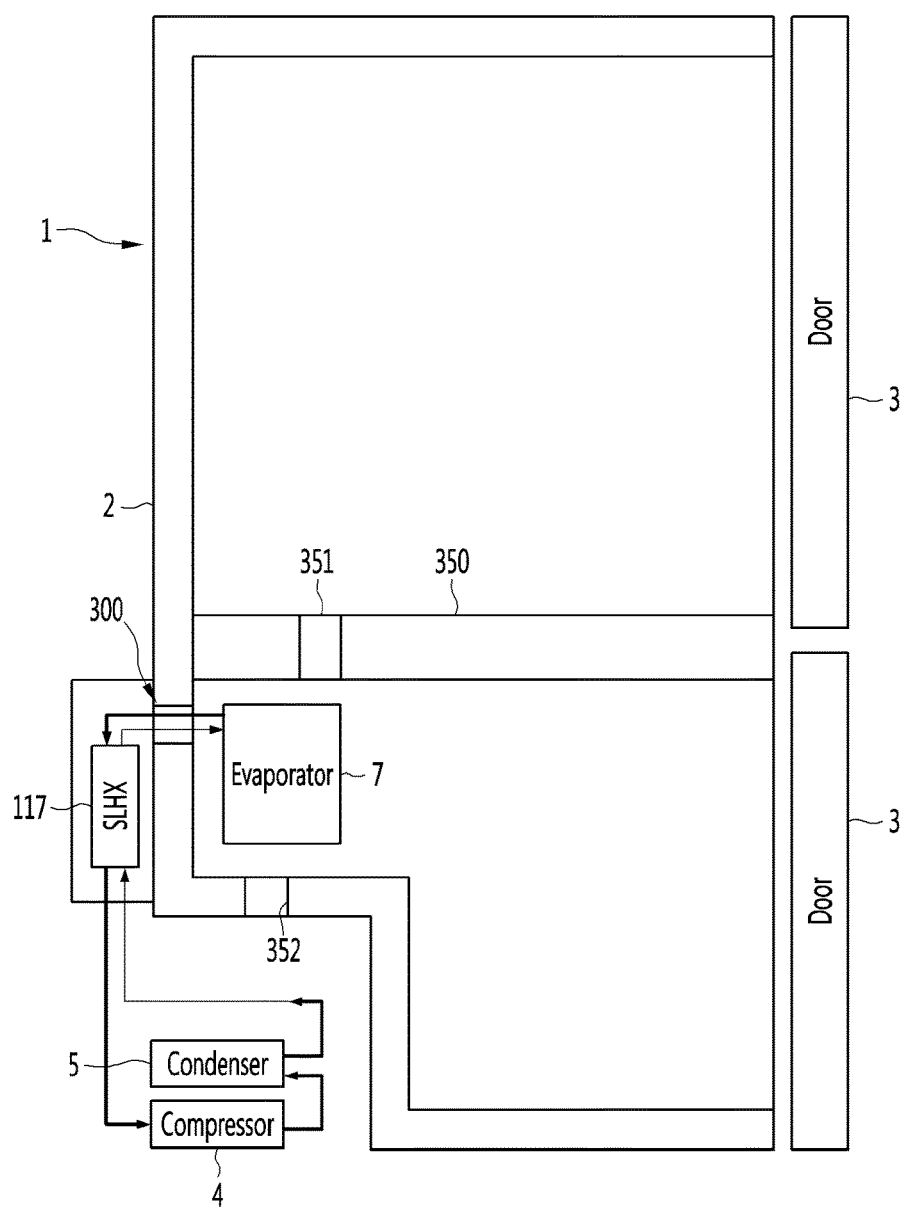

[Fig. 11]
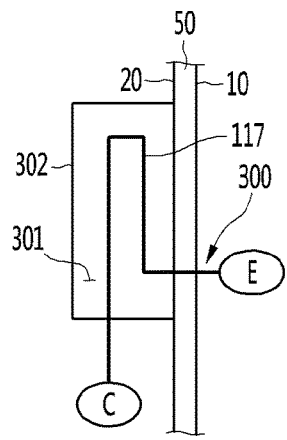
[Fig. 12]
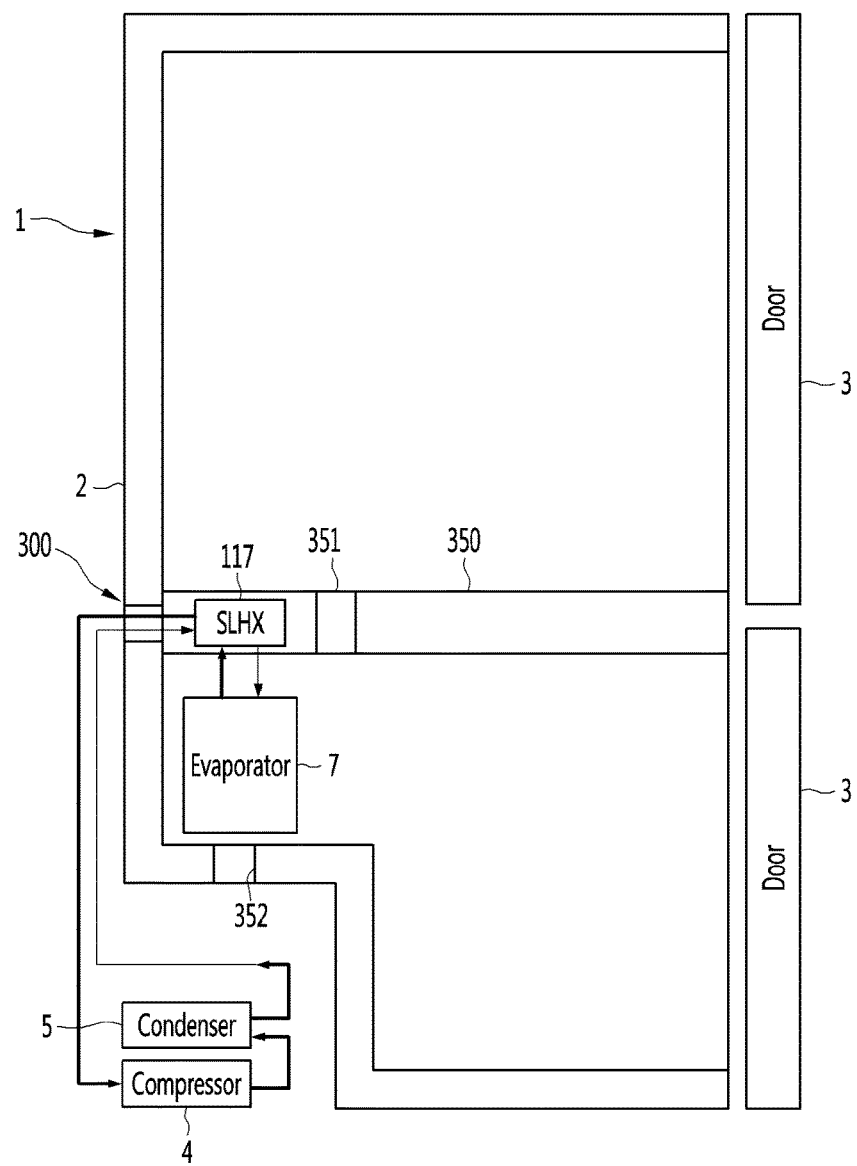

[Fig. 13]
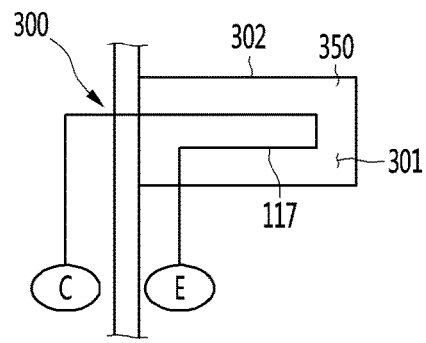
[Fig. 14]
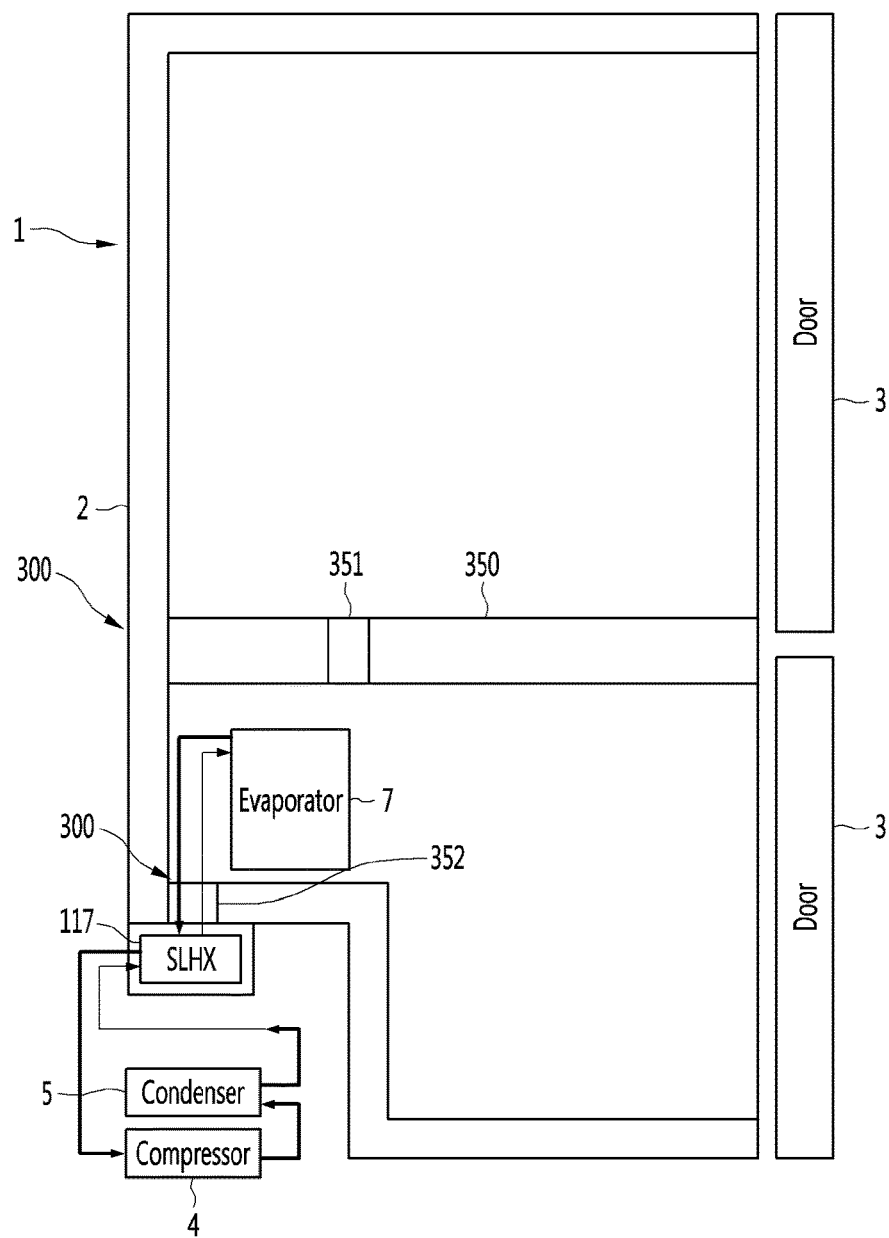

[Fig. 15]
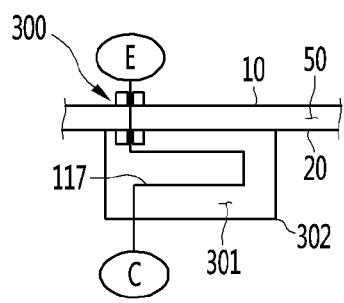
[Fig. 16]
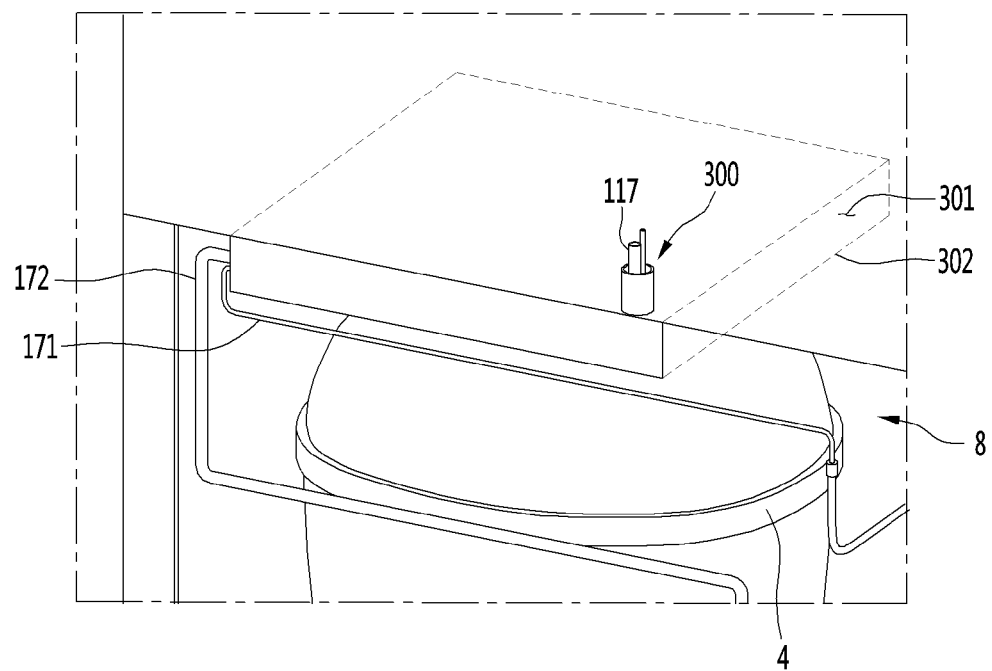

[Fig. 17]
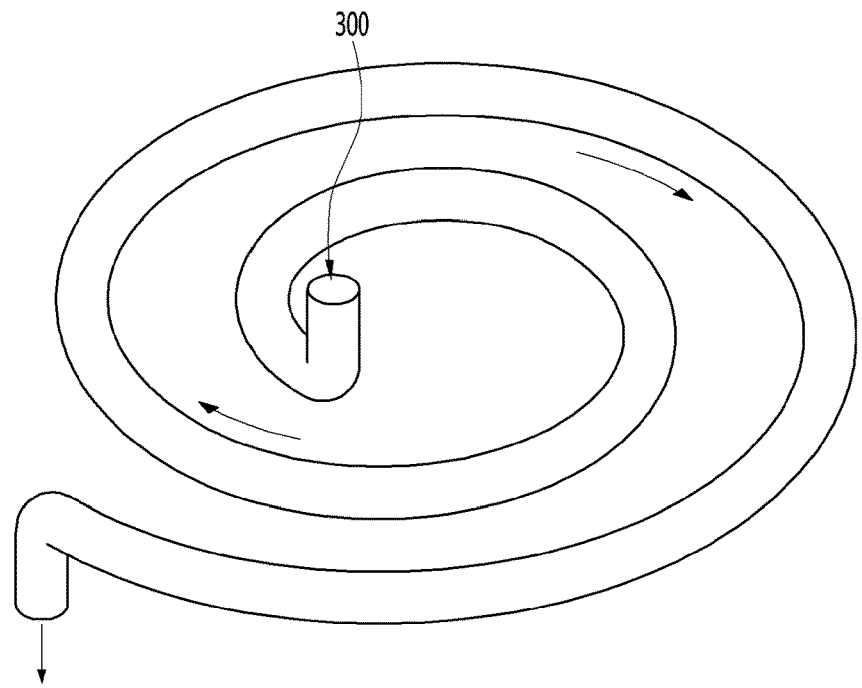
[Fig. 18]
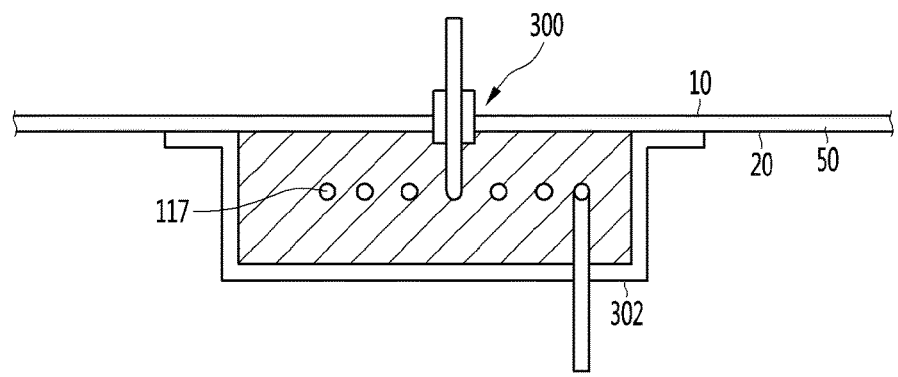
[Fig. 19]
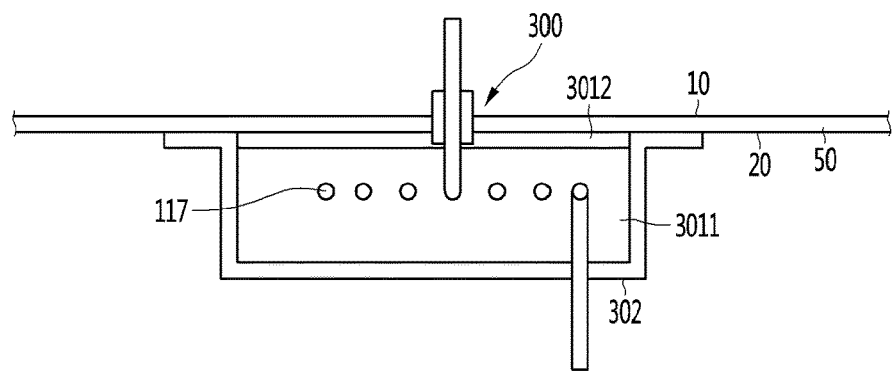

[Fig. 20]
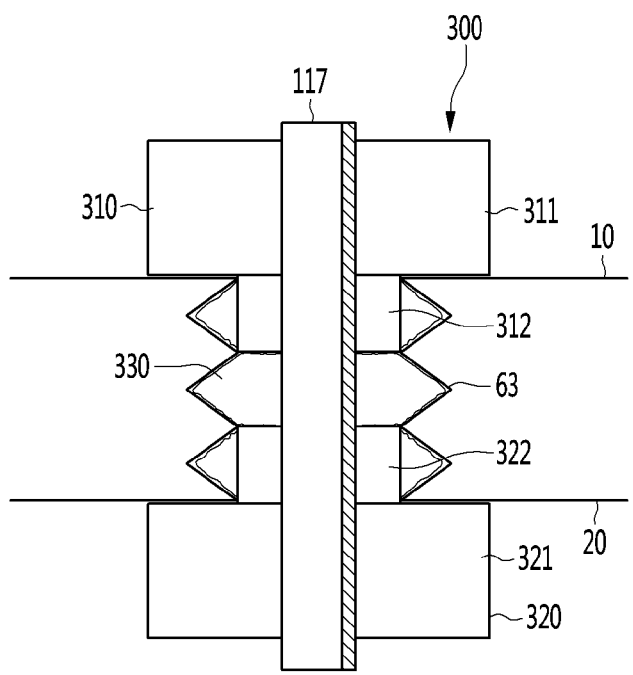

[Fig. 21]
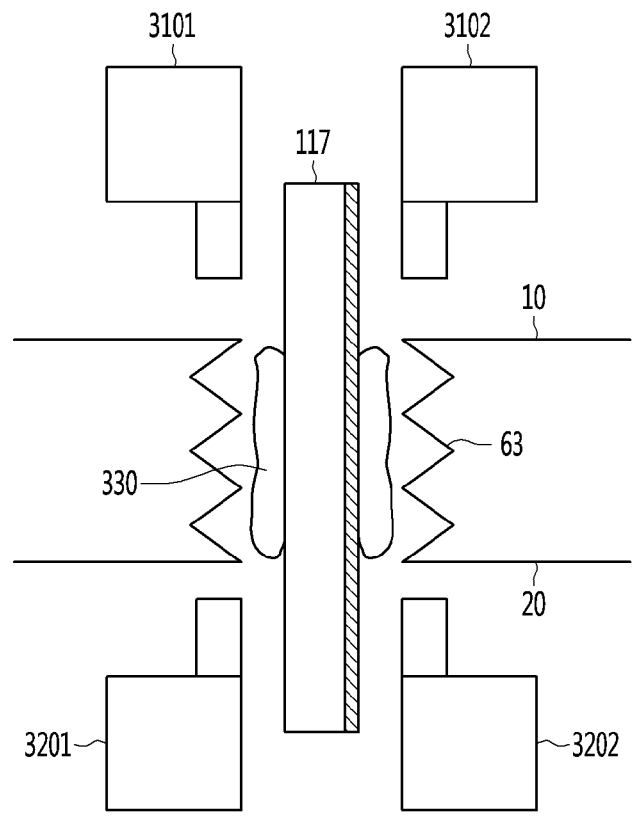
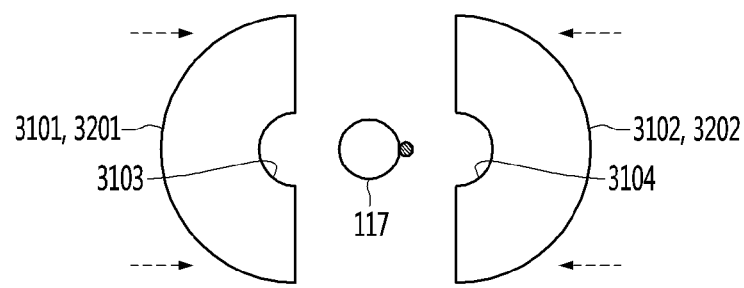

[Fig. 22]
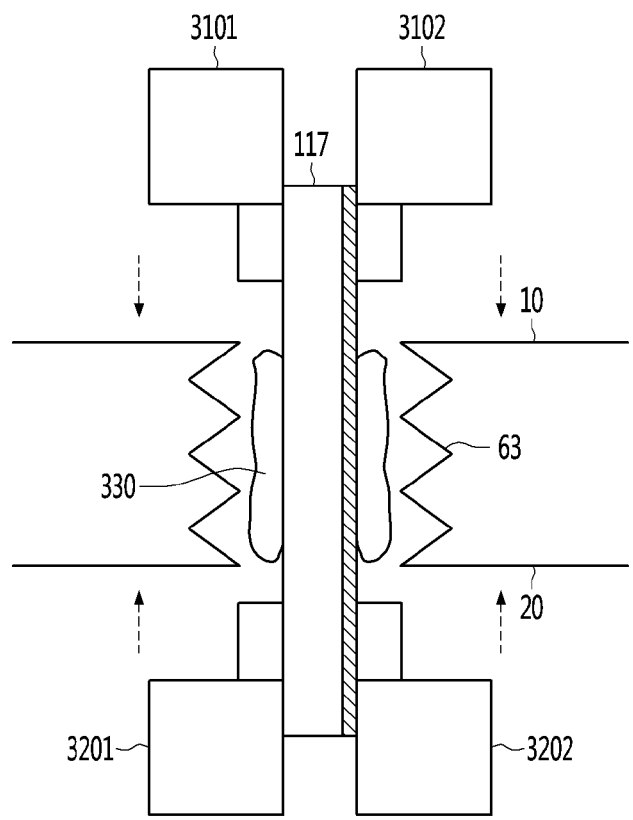
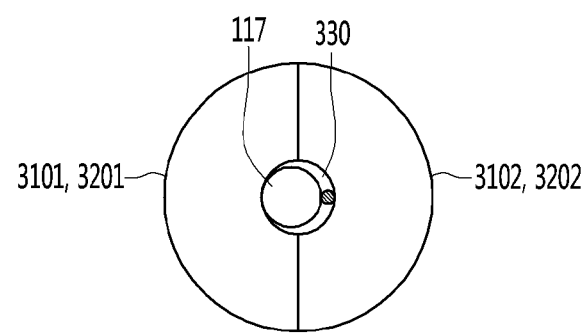

[Fig. 27]
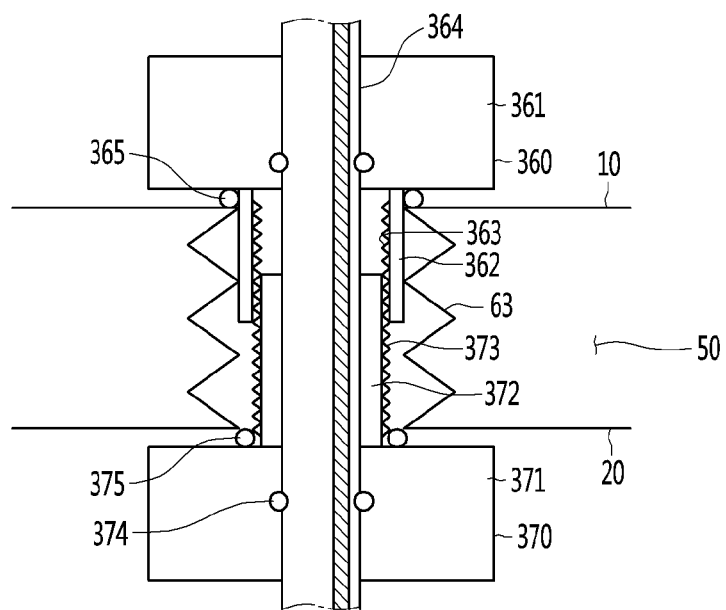

[Fig. 28]
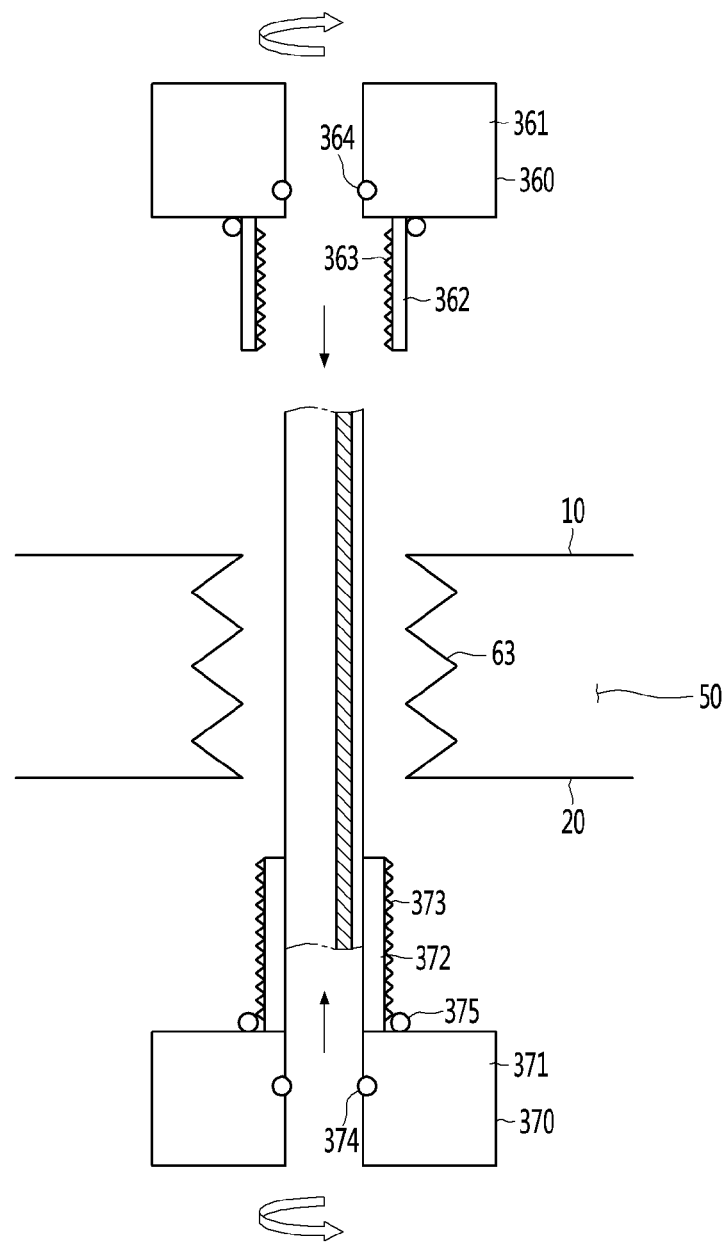

[Fig. 29]
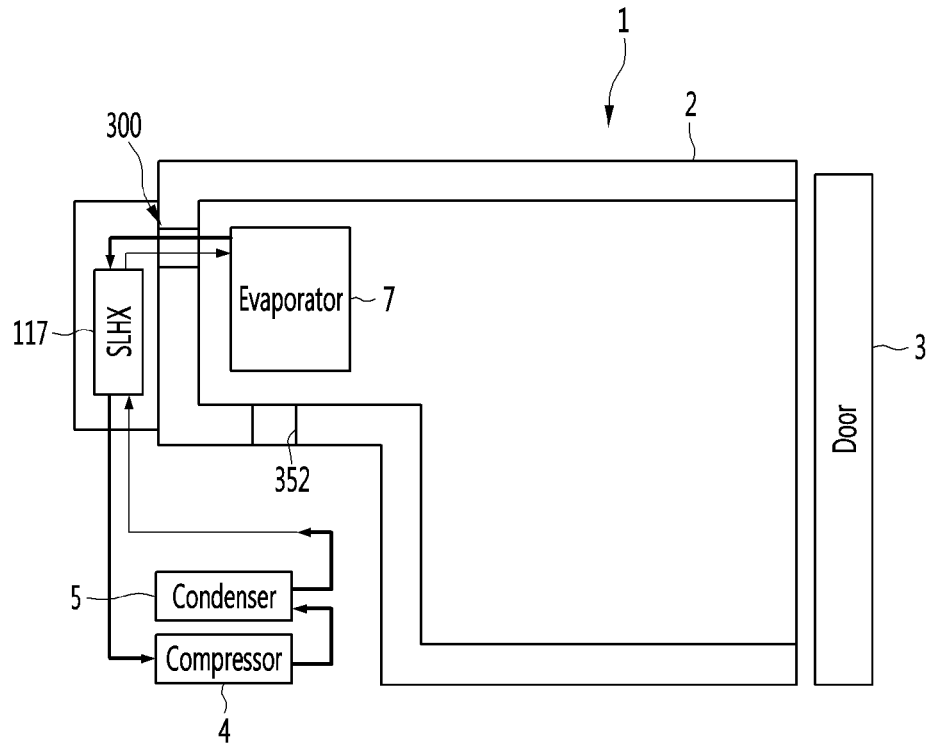
[Fig. 30]
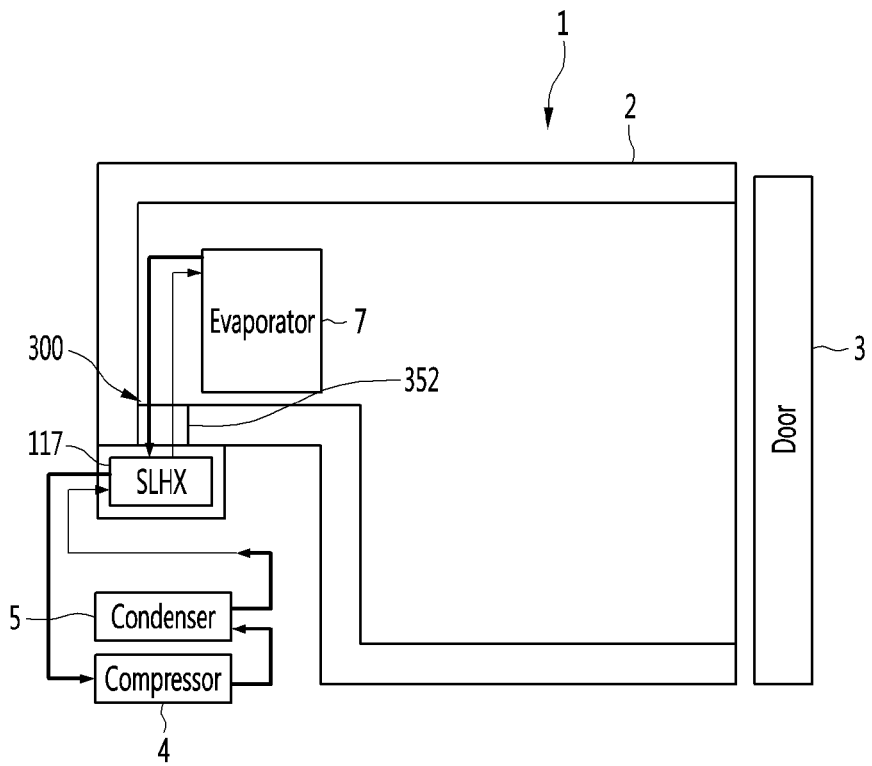

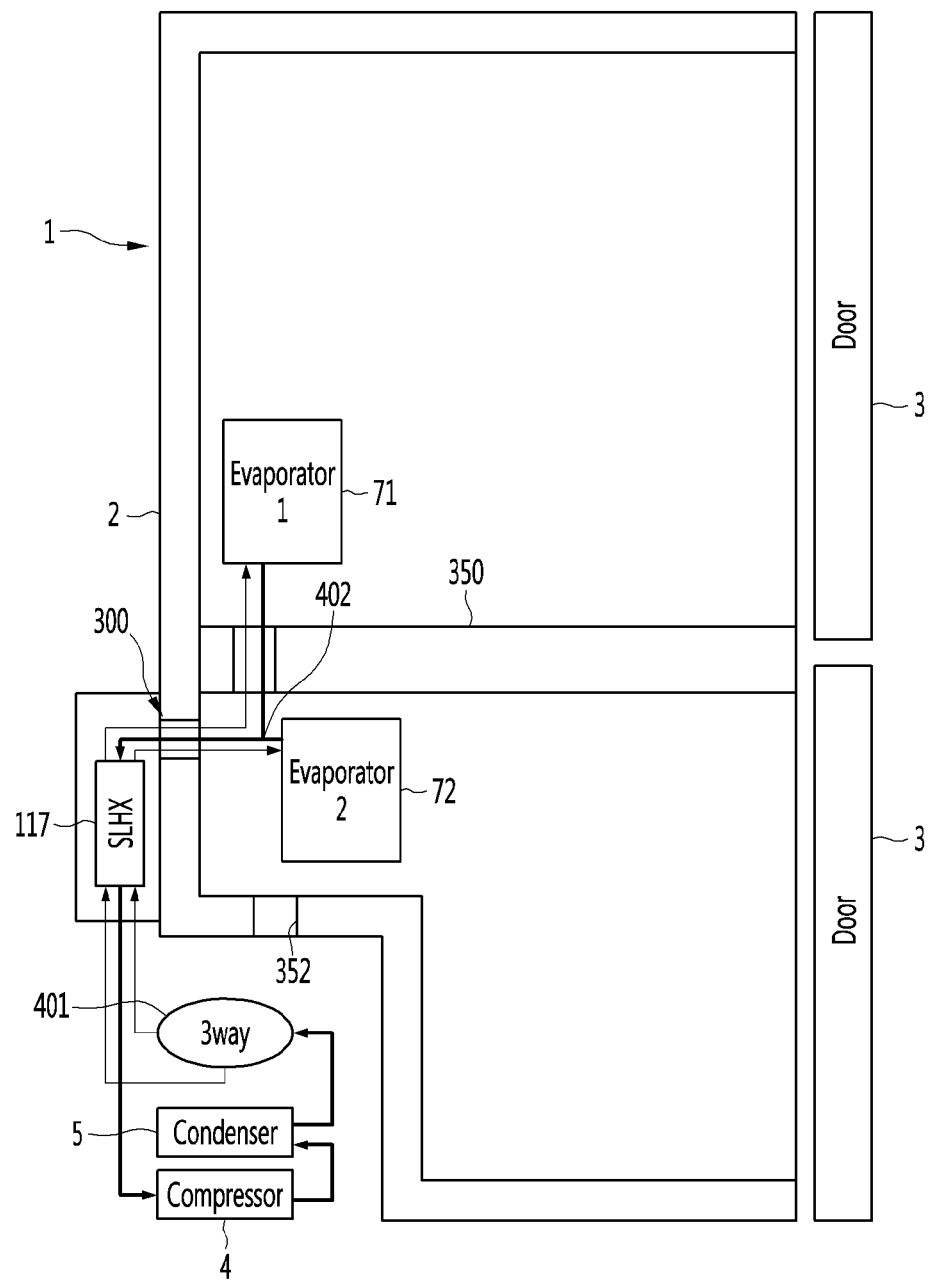
[Fig. 31]

[Fig. 32]
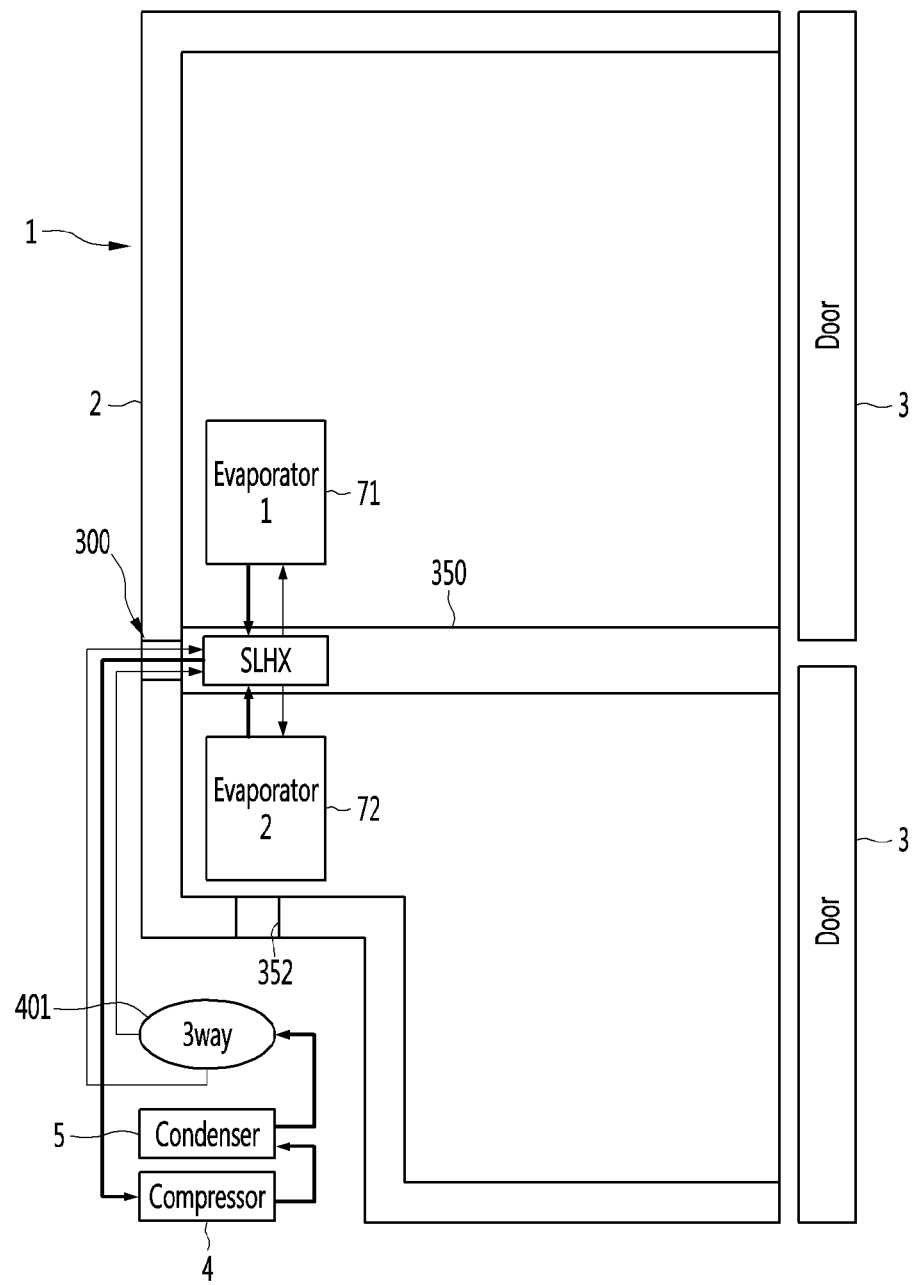

[Fig. 33]
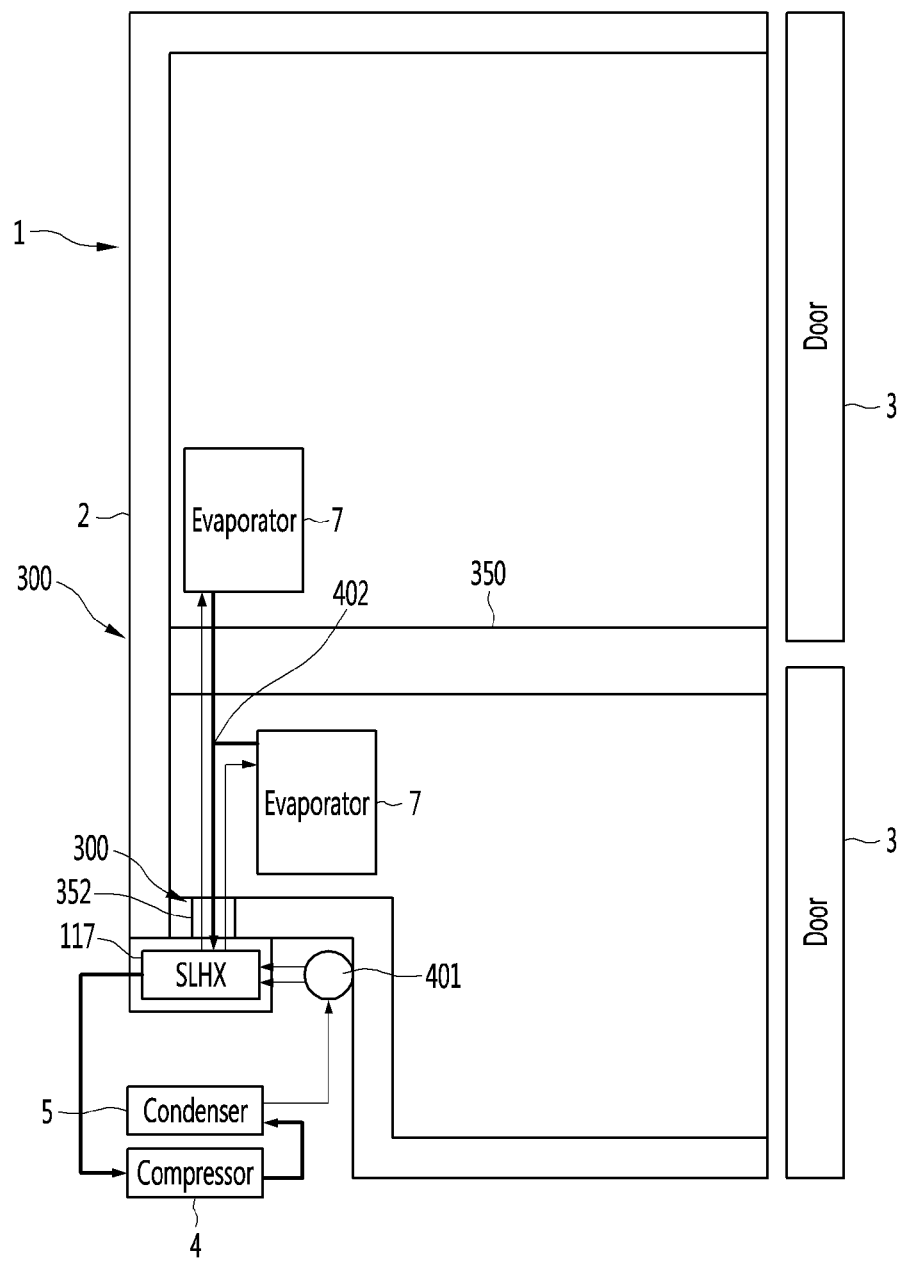

[Fig. 34]
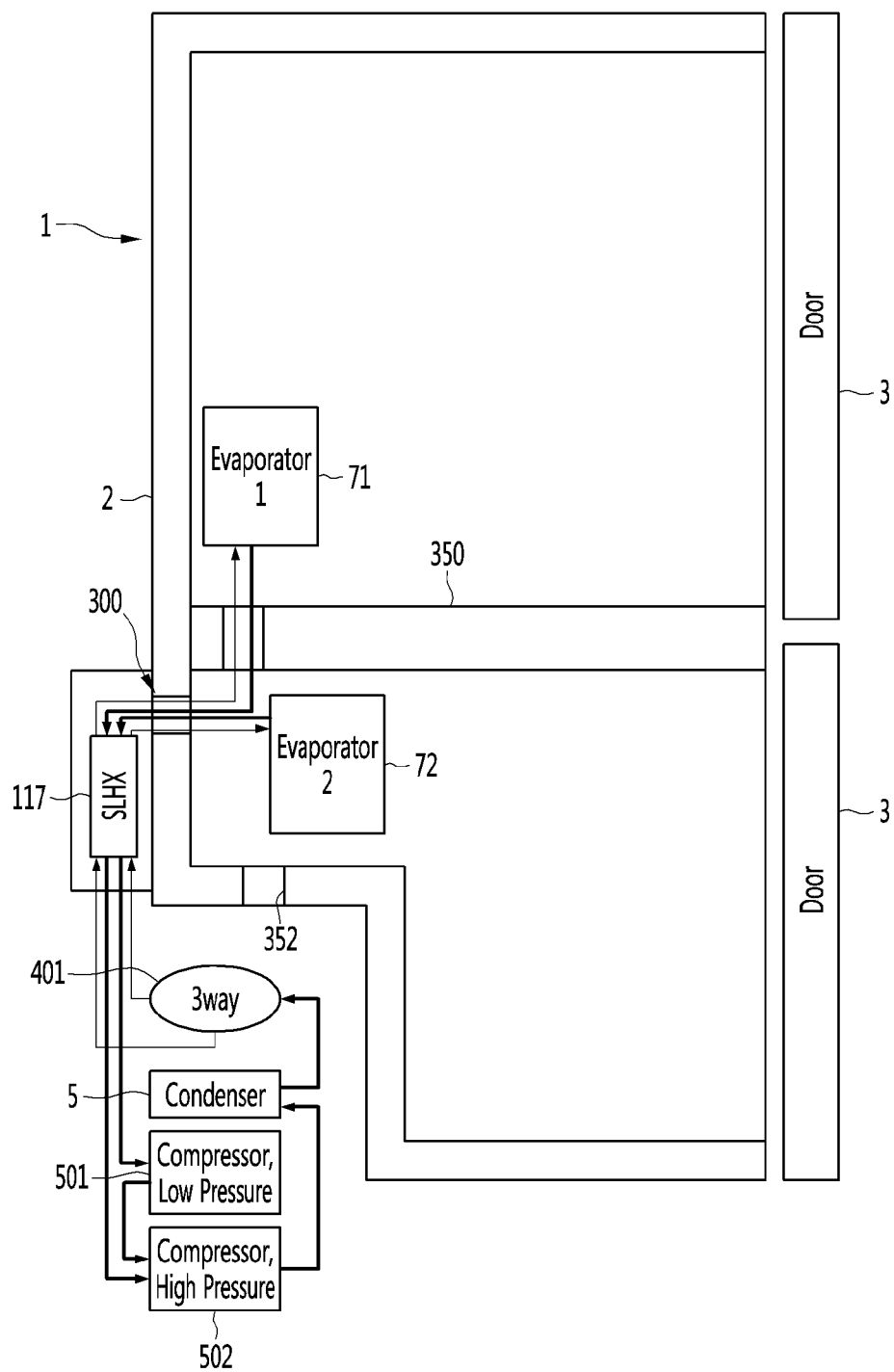

[Fig. 35]
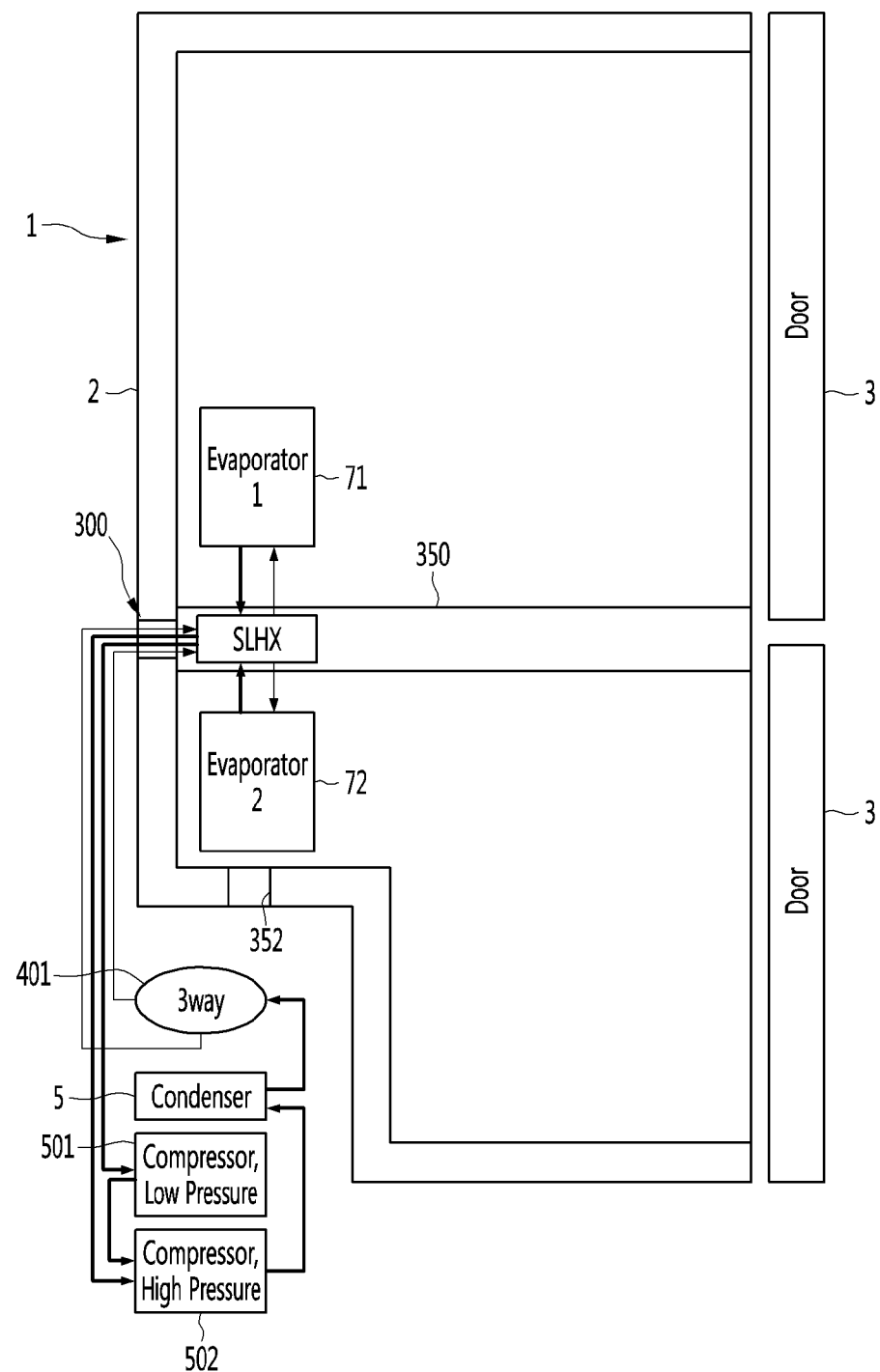

[Fig. 36]
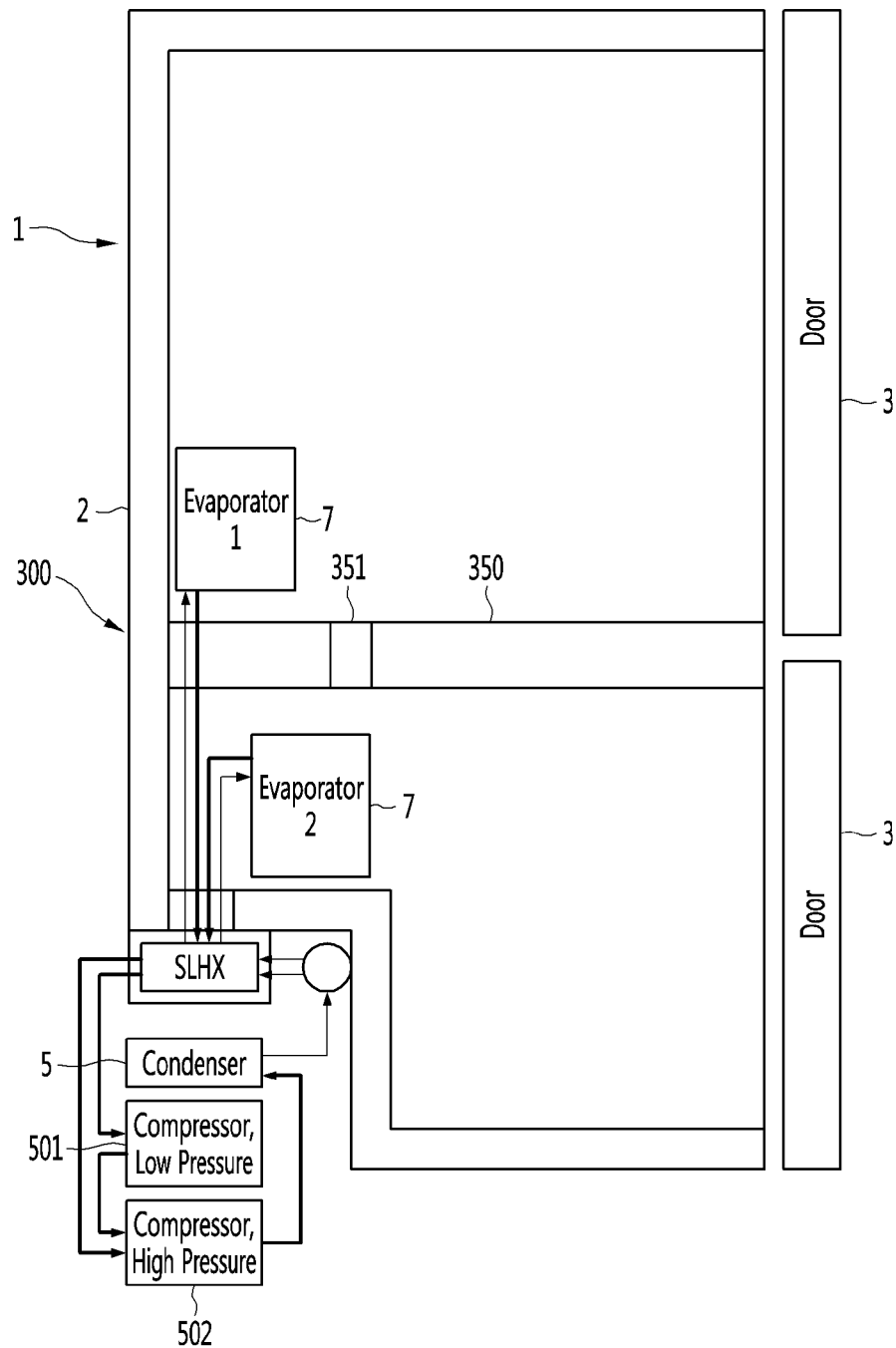

[Fig. 37]
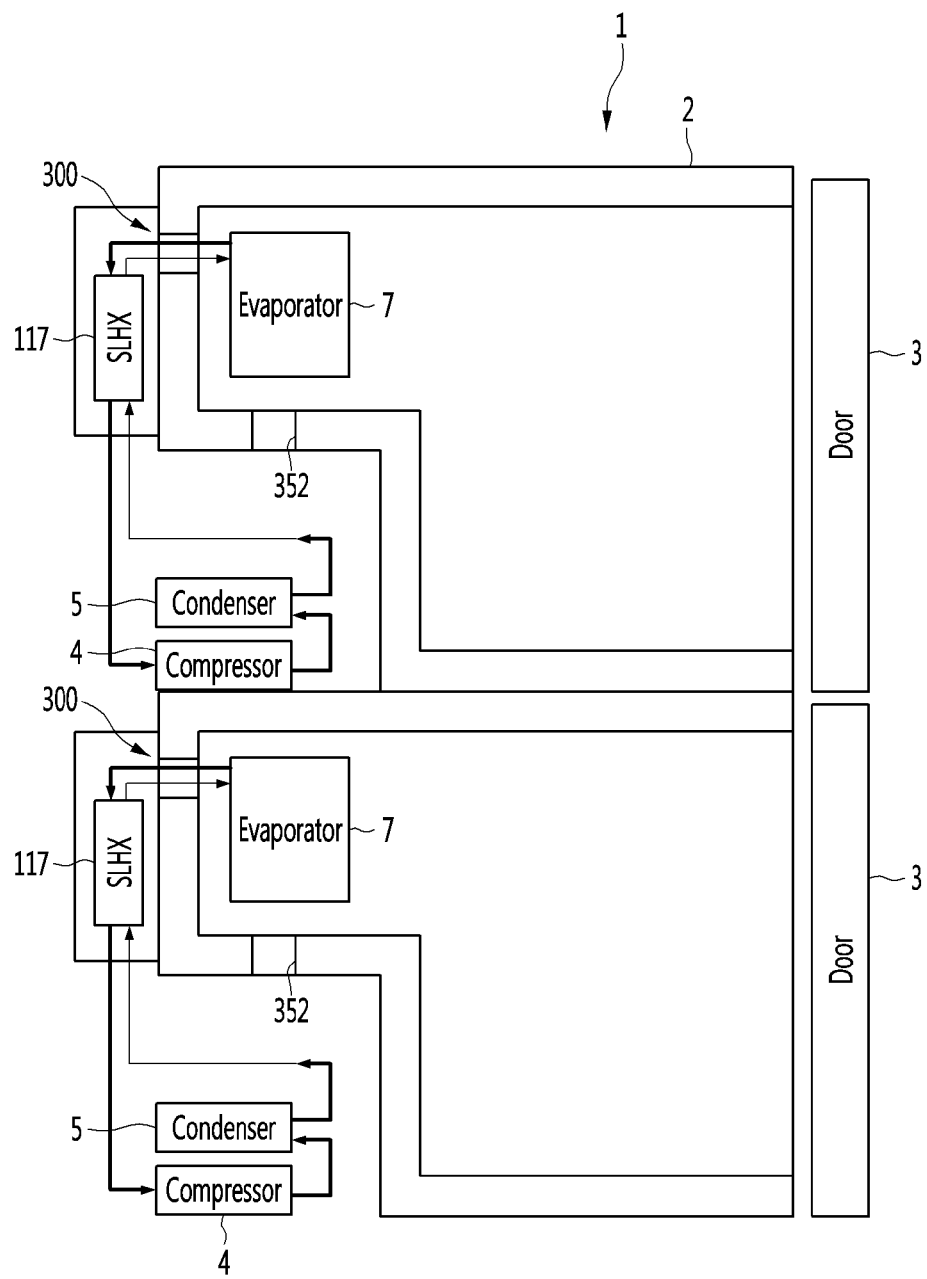

[Fig. 38]
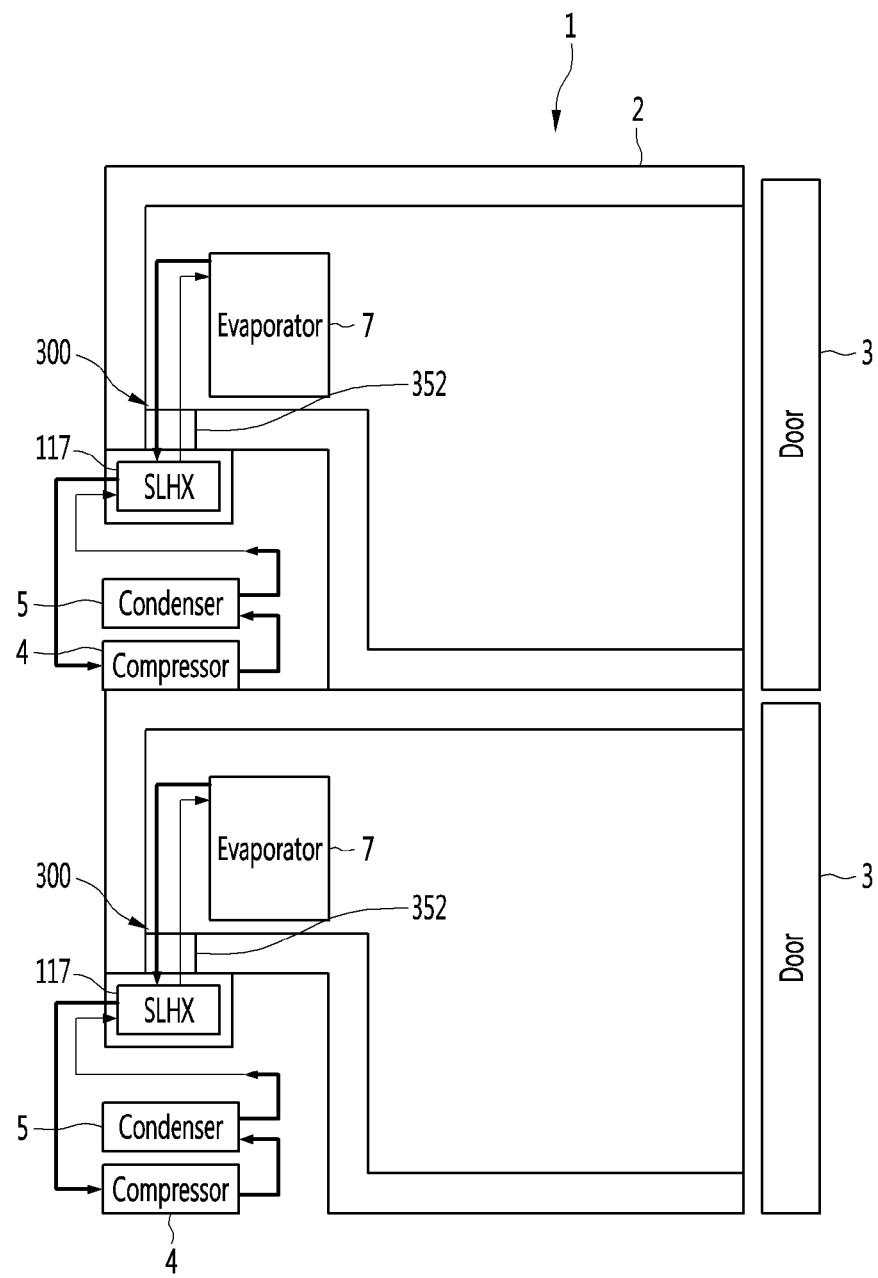

[Fig. 39]
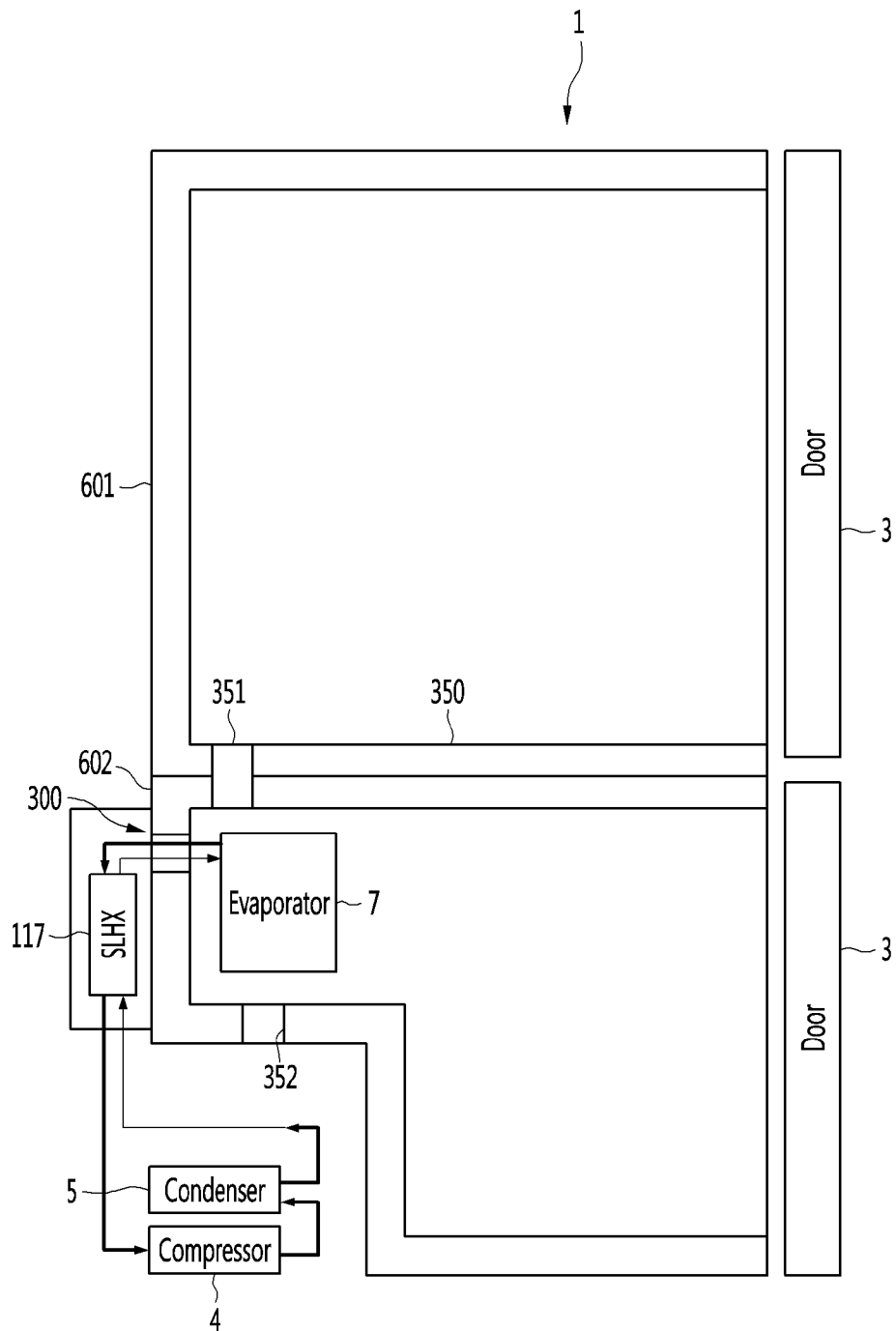

[Fig. 40]
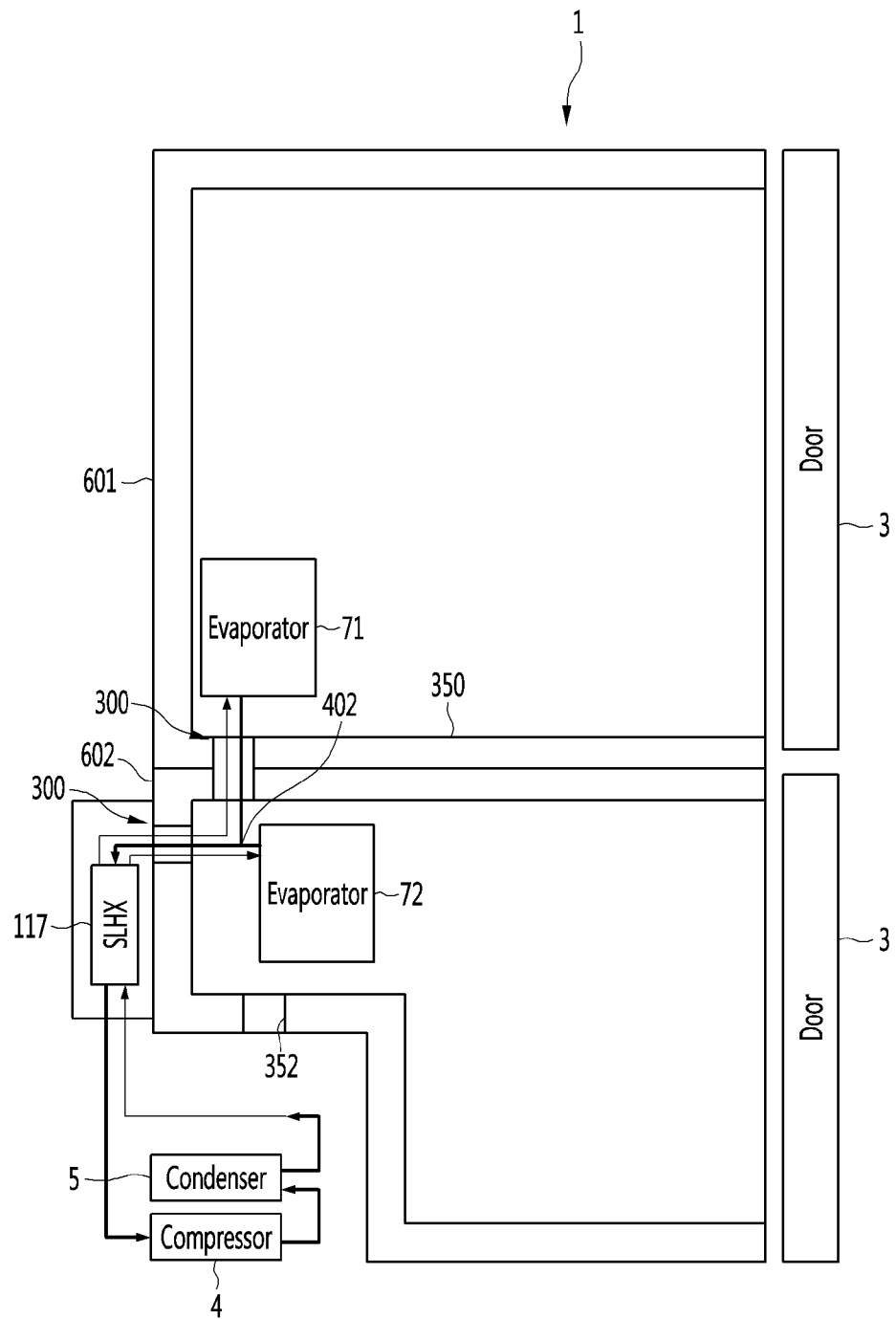

VACUUM ADIABATIC BODY AND REFRIGERATOR

CROSS-REFERENCE TO RELATED APPLICATIONS

This application is a U.S. National Stage Application under 35 U.S.C. § 371 of PCT Application No. PCT/KR2019/007763, filed Jun. 26, 2019, which claims priority to Korean Patent Application No. 10-2018-0074280, filed Jun. 27, 2018, whose entire disclosures are hereby incorporated by reference.

TECHNICAL FIELD

The present disclosure relates to a vacuum adiabatic body and a refrigerator.

BACKGROUND ART

A vacuum adiabatic body is a product to suppress heat transfer by vacuumizing the interior of a body thereof. The vacuum adiabatic body may reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator.

Korean Patent No. 10-0343719 (Cited Document 1) discloses a method in which a vacuum adiabatic panel is prepared and then built in walls of a refrigerator, and the exterior of the vacuum adiabatic panel is finished with a separate molding such as Styrofoam. According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Cited Document 2). According to Reference Document 2, fabrication cost is increased, and a fabrication method is complicated.

To solve this problem, the present applicant had filed Korean Patent Application NO. 10-2013-0049495 (Cited Document 3), which discloses a technique that provides a vacuum adiabatic body in an empty vacuum state without providing a separate adiabatic material therein. In addition, this technique provides a heat exchange pipeline provided in the vacuum adiabatic body. The heat exchange pipeline is a pipeline in which two pipelines, i.e., an inlet pipe of an evaporator and an outlet pipe of the evaporator, contact each other. The heat exchange pipeline is a pipeline in which a refrigerant flowing through the inside of the two pipelines are heat-exchanged with each other to improve performance of a refrigerating cycle.

The heat exchange pipeline passes through the inside of the vacuum space part to extend to the outside and inside of the refrigerator. Thus, to maintain the vacuum state of the vacuum space part, a position at which the heat exchange pipeline passes through the vacuum space part and a plate inside the refrigerator may be sealed. To achieve the above objects, this applicant has disclosed a structure to seal a separate pipeline of a branched heat exchange pipeline in FIGS. 17 and 18, which is disclosed in Korean Patent Application No. 10-2017-0171596 (Cited Document 4).

According to the cited document 4, to maintain the sealing, the two pipelines of the heat exchange pipelines may be branched to pass through the vacuum space part to cause four penetrated portions or openings. However, as the number of penetrated portions increases, a heat loss may occur. Also, it may be difficult to maintain a vacuum in the vacuum space part if there is a problem in any one of the penetrated portions. Also, a welding part of the two pipelines may be exposed to the vacuum space part, and thus, a gas generated from the welding part may destroy the vacuum state of the vacuum space part.

In addition, a pressure loss of a refrigerant may occur due to a sharp bending angle of the branched point of each of the two pipelines constituting the heat exchange pipelines. The bending angle of the heat exchange pipeline more increases due to a pitch gap (about 200 mm) of the bar constituting the supporting unit. Also, since heterogeneous bonding is performed between a stainless material forming the vacuum space part and a copper material forming the heat exchange pipeline at the penetrated portion, it is difficult to carry out the work or installation.

The cited documents disclose a feature in which the heat exchange pipeline is placed in the vacuum adiabatic body to maintain the thermal insulation. For this, since many pipelines of the heat exchange pipeline may be provided at the fixed positions within the vacuum adiabatic body before the vacuum adiabatic body is vacuum sealed, it may be difficult to perform the work or installation. Also, there is a high possibility that the vacuum state of the vacuum adiabatic body is destroyed by the sealing, which may lead to discarding the vacuum adiabatic body.

DISCLOSURE

Technical Problem

Embodiments provide a vacuum adiabatic body in which difficulty in work is solved at a portion at which a heat exchange pipeline passes through a vacuum space part, and the number of penetrated portions is reduced.

Embodiments also provide a vacuum adiabatic body in which a gas generated from a welding part of two pipelines constituting the heat exchange pipeline does not have an influence on an inner space of a vacuum space part.

Embodiments also provide a vacuum adiabatic body in which a pressure loss of a refrigerant due to sharp bending of a heat exchange pipeline is reduced.

Embodiments also provide a vacuum adiabatic body in which leakage and difficulty of work, which occur due to heterogeneous welding between a heat exchange pipeline and a vacuum space part, are solved.

Embodiments also provide a vacuum adiabatic body in which a heat exchange pipeline is easily installed, and vacuum breakage within the vacuum adiabatic body or a destruction of a vacuum state of a vacuum space is prevented at first or when installed.

Technical Solution

In one embodiment, a refrigerator may include a heat exchange pipeline including at least two pipeline passing through a first plate member and a second plate member to allow a refrigerant to move to internal and external spaces and a through-part or opening which is provided in at least one of the first plate member and the second plate member and through which the refrigerant pipe passes. A sealing member may be configured to accommodate the refrigerant pipe therein, may be coupled to at least one of the first plate member and the second plate member, and may be made of a material having a thermal conductivity less than that of each of the first plate member and the second plate member.

Since the heat exchange is not exposed to the vacuum space part, the vacuum space part may not be adversely affected, and vacuum performance may be improved.

In another embodiment, a refrigerator may include a refrigerant pipe which passes through a through-part or opening of a first plate member and a through-part or opening of a second plate member. A refrigerant moves through the openings to a first space and a second space. A through sealing part or assembly may be configured to accommodate or receive the refrigerant pipe therein and seal the pair of through-parts so as to block conduction of cold air between the first space and the second space.

Thus, cold air loss prevention performance may be improved.

In further another embodiment, a refrigerator includes a through-part or opening which is provided in at least one of the first plate member or the second plate member and through which the refrigerant pipe passes. A sealing member may be configured to accommodate the refrigerant pipe and may be made of a material having a thermal conductivity less than that of each of the first plate member and the second plate member. The sealing member is supported by at least one of the first plate member or the second plate member, prevents cold air of the first space from leaking to the second space, and allows the refrigerant pipe to be spaced apart from the first plate member and the second plate member.

Thus, a heat loss or transfer may be reduced, a lifespan of a product may increase, and breakage of the vacuum space may be prevented.

Advantageous Effects

According to the embodiment, the number of through-parts or openings through which the heat exchange pipeline passes through the vacuum space part may be reduced to one, and the through-part may be sealed by the separate conductive resistance sheet. Thus, the heat loss may be reduced, and also, the fear of vacuum breakage of or a loss of a vacuum state in the vacuum space part may be also reduced.

According to the embodiment, since the heat exchange pipeline is not exposed to the vacuum space part, the increase of the gas within the vacuum space part due to the heat exchange pipeline may be prevented or reduced to improve the lifespan of the product.

According to the embodiment, since there is no need to unreasonably bend the heat exchange pipeline in the vacuum space part, the pressure loss of the refrigerant due to the unexpected deformation of the refrigerant pipeline may be reduced.

According to the embodiment, the installation work of the heat exchange pipeline may be easy, and the reliability of the sealing maintenance of the vacuum space part may be improved.

DESCRIPTION OF DRAWINGS

FIG. 1 is a perspective view of a refrigerator according to an embodiment.

FIG. 2 is a view schematically showing a vacuum adiabatic body used in a main body and a door of the refrigerator.

FIG. 4 is a diagram illustrating results obtained by examining resins.

FIG. 5 illustrates results obtained by performing an experiment on vacuum maintenance performances of resins.

FIG. 7 illustrates results obtained by measuring maximum deformation temperatures at which resins are damaged by atmospheric pressure in high-temperature exhaustion.

FIG. 9 is a view illustrating a configuration of an installation part of the heat exchange pipeline according to an embodiment.

FIG. 10 is a view of a refrigerant to which the installation part of the heat exchange pipeline of FIG. 9 is applied according to an embodiment.

FIG. 11 is a conceptual view of the embodiment of FIG. 10 with respect to a path of the heat exchange pipeline.

FIG. 12 is a view of a refrigerant to which an installation part of a heat exchange pipeline is applied according to another embodiment.

FIG. 13 is a conceptual view of the embodiment of FIG. 12 with respect to a path of the heat exchange pipeline.

FIG. 14 is a view of a refrigerant to which an installation part of a heat exchange pipeline is applied according to further another embodiment.

FIG. 15 is a conceptual view of the embodiment of FIG. 14 with respect to a path of the heat exchange pipeline.

FIG. 16 is a perspective view of the embodiment of FIG. 15.

FIG. 17 is a view illustrating an arrangement of the heat exchange pipeline in which a limitation of FIG. 16 is solved.

FIG. 18 is a view for explaining an adiabatic structure of the heat exchange pipeline provided in FIG. 17.

FIG. 19 is a view for explaining another example of the adiabatic structure of the heat exchange pipeline of FIG. 17.

FIG. 20 is a cross-sectional view illustrating a configuration of a through sealing part.

FIGS. 21A, 21B, 22A, and 22B are views illustrating a process of manufacturing the through sealing part.

FIGS. 27 and 28 are views of a through sealing part or assembly according to another embodiment.

FIGS. 29 to 40 are views illustrating various embodiments in which the heat exchange pipeline is installed according to various refrigerators to which the vacuum adiabatic body is applied.

MODE FOR INVENTION

Figure 3A:
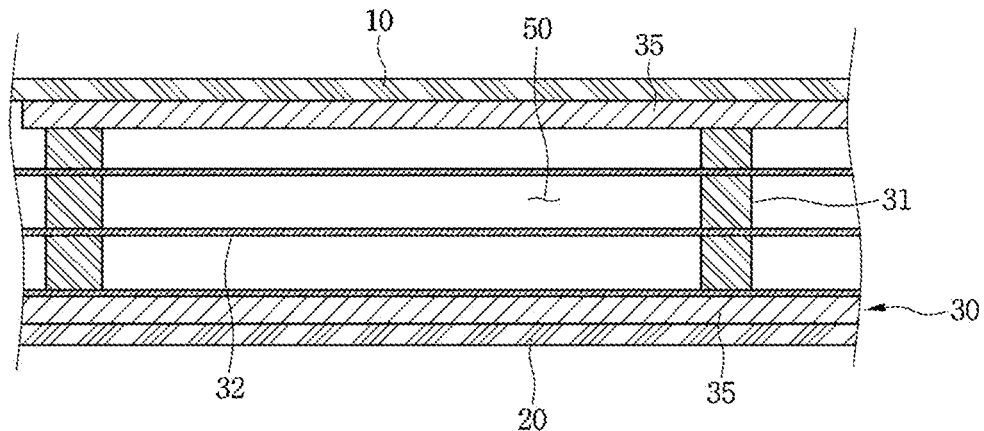
FIGS. 3A and 3B shows view illustrating various embodiments of an internal configuration of a vacuum space part.

Hereinafter, exemplary embodiments will be described with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention.

The drawings shown below may be displayed differently from the actual product, or exaggerated or simple or detailed parts may be deleted, but this is intended to facilitate understanding of the technical idea of the present invention. It should not be construed as limited.

The number of each of the components illustrated together with the drawings facilitates the understanding of the inventive concept by assigning the same or similar number to the same or similar component in function. Similarly, in the case of performing the same or similar function in function even if the embodiments are different, the same or similar number is assigned to facilitate the understanding of the invention.

In the accompanying drawings for providing further understanding of the invention, the same reference numeral will be given to the same member in each of the drawings. This is to avoid duplicated explanations in the understanding of the idea of the invention and focus on the differences between the technologies.

In the following description, the vacuum pressure means any pressure state lower than the atmospheric pressure. In addition, the expression that a vacuum degree of A is higher than that of B means that a vacuum pressure of A is lower than that of B.

FIG. 1 is a perspective view of a refrigerator according to an embodiment.

Referring to FIG. 1, the refrigerator 1 includes a main body 2 provided with a cavity 9 capable of storing storage goods and a door 3 provided to open or close the main body 2. The door 3 may be rotatably or slidably movably provided to open or close the cavity 9. The cavity 9 may provide at least one of a refrigerating compartment and a freezing compartment.

The cavity 9 may be supplied with parts or devices of a refrigeration or a freezing cycle in which cold air is supplied into the cavity 9. For example, the parts may include a compressor 4 to compress a refrigerant, a condenser 5 to condense the compressed refrigerant, an expander 6 to expand the condensed refrigerant, and an evaporator 7 to evaporate the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

FIG. 2 is a view schematically showing a vacuum adiabatic body used in the main body 2 and the door 3 of the refrigerator 1. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets 60 or 63 are provided are schematically illustrated for convenience of understanding.

Referring to FIG. 2, the vacuum adiabatic body may include a first plate member 10 to provide a wall of a low-temperature space or a first space, a second plate member 20 to provide a wall of a high-temperature space or a second space, and a vacuum space part or a third space 50 defined as a gap between the first and second plate members 10 and 20. Also, the vacuum adiabatic body includes the conductive resistance sheets 60 and 63 to prevent heat conduction between the first and second plate members 10 and 20. A sealing or welding part 61 may seal the conductive resistance sheets 60 and 63 to the first and second plate members 10 and 20 such that the vacuum space part 50 is in a sealed or vacuum state.

When the vacuum adiabatic body is applied to a refrigerator or a warming apparatus, the first plate member 10 providing a wall of an internal or inner space of the refrigerator may be referred to as an inner case, and the second plate member 20 providing a wall of an outer space of the refrigerator may be referred to as an outer case.

A machine room 8 may include parts providing a refrigerating or a freezing cycle. The machine room may be placed at a lower rear side of the main body-side vacuum adiabatic body, and an exhaust port 40 to form a vacuum state by exhausting air from the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are thermal or heat conduction between the first and second plate members 10 and 20, heat radiation between the first and second plate members 10 and 20, and gas conduction of the vacuum space part 50.

Hereinafter, a heat resistance unit or sheet provided to reduce adiabatic loss related to the factors of the heat transfer will be provided. The vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

The heat resistance unit may include a conductive resistance sheet 60 or 63 that resists conduction of heat transferred along a wall of a third space 50 and may further include a side frame coupled to the conductive resistance sheet. The conductive resistance sheet 60 or 63 and the side frame will be clarified by the following description.

Also, the heat resistance unit may include at least one radiation resistance sheet 32 that is provided in a plate shape within the third space 50 or may include a porous material that resists radiation heat transfer between the second plate member 20 and the first plate member 10 within the third space 50. The radiation resistance sheet 32 and the porous material will be clarified by the following description.

Figure 3B:
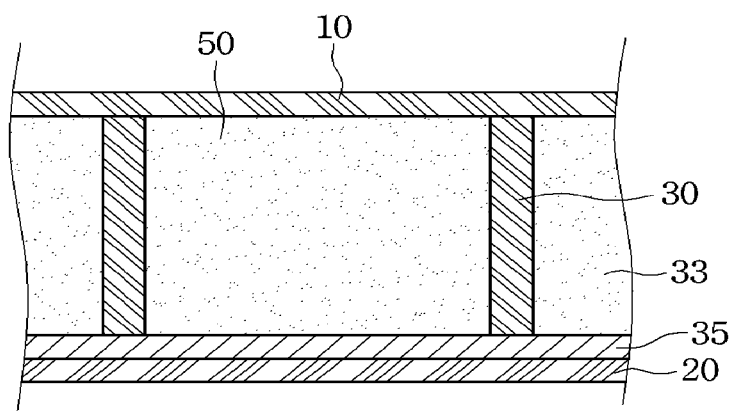

FIGS. 3A-3B are views illustrating various embodiments of an internal configuration of the vacuum space part or third space 50.

First, referring to FIG. 3A, the vacuum space part 50 may have a pressure different from that of each of the first and second spaces, such as in a vacuum state, thereby reducing an adiabatic loss. The vacuum space part 50 may be provided at a temperature between the temperature of the first space and the temperature of the second space. Since the vacuum space part 50 is provided as a space in the vacuum state, the first and second plate members 10 and 20 receive a force contracted in a direction in which they approach each other due to a force corresponding to a pressure difference between the first and second spaces. Therefore, the vacuum space part 50 may be deformed in a direction in which it is reduced. In this case, the adiabatic loss may be caused due to an increase in amount of heat radiation, caused by the contraction of the vacuum space part 50, and an increase in amount of thermal or heat conduction, caused by contact between the plate members 10 and 20.

The supporting unit or support 30 may be provided to reduce deformation of the vacuum space part 50. The supporting unit 30 includes a bar 31. The bar 31 may extend in a substantially vertical direction with respect to the plate members 10 and 20 to support a distance between the first plate member 10 and the second plate member 20. A support plate 35 may be additionally provided on at least any one end of the bar 31. The support plate 35 may connect at least two or more bars 31 to each other to extend in a horizontal direction with respect to the first and second plate members 10 and 20. The support plate 35 may be provided in a plate shape or may be provided in a lattice shape so that an area of the support plate contacting the first or second plate member 10 or 20 decreases, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 may be diffused through the support plate 35.

A material of the supporting unit 30 will be described.

The supporting unit 30 may have a high compressive strength so as to endure the vacuum pressure, a low outgassing rate and a low water absorption rate so as to maintain the vacuum state, a low thermal conductivity so as to reduce the thermal conduction between the plate members 10 and 20 and. Also, the supporting unit 30 may have a secure compressive strength at a high temperature so as to endure a high-temperature exhaust process, have an excellent machinability so as to be subjected to molding, and have a low cost for molding. Here, the time required to perform the exhaust process takes about a few days. Hence, the time is reduced, thereby considerably improving fabrication cost and productivity. Therefore, the compressive strength is to be secured at the high temperature because an exhaust speed is increased as a temperature at which the exhaust process is performed becomes higher. The inventor has performed various examinations under the above-described conditions.

First, ceramic or glass has a low outgassing rate and a low water absorption rate, but its machinability is remarkably lowered. Hence, ceramic and glass may not be used as the material of the supporting unit 30. Resin may be considered as the material of the supporting unit 30.

FIG. 4 is a diagram illustrating results obtained by examining resins.

Referring to FIG. 4, the present inventor has examined various resins, and most of the resins may not be used because their outgassing rates and water absorption rates are remarkably high. Accordingly, the present inventor has examined resins that approximately satisfy conditions of the outgassing rate and the water absorption rate. As a result, polyethylene (PE) may not be used due to its high outgassing rate and its low compressive strength. Polychlorotrifluoroethylene (PCTFE) may not be used due to its remarkably high price. Polyether ether ketone PEEK may not be used due to its high outgassing rate. A resin selected from the group consisting of polycarbonate (PC), glass fiber PC, low outgassing PC, polyphenylene sulfide (PPS), and liquid crystal polymer (LCP) may be used as the material of the supporting unit 30. However, an outgassing rate of PC is 0.19, which is at a low level. Hence, as the time required to perform baking in which exhaustion is performed by applying heat is increased to a certain level, PC may be used as the material of the supporting unit 30.

The present inventor has found an optimal material by performing various studies on resins expected to be used inside the vacuum space part 50. Hereinafter, results of the performed studies will be described with reference to the accompanying drawings.

FIG. 5 is a view illustrating results obtained by performing an experiment on vacuum maintenance performances of the resins.

Referring to FIG. 5, there is illustrated a graph showing results obtained by fabricating the supporting unit 30 using the respective resins and then testing vacuum maintenance performances of the resins. First, a supporting unit 30 fabricated using a selected material was cleaned using ethanol, left at a low pressure for 48 hours, exposed to the air for 2.5 hours, and then subjected to an exhaust process at 90° C. for about 50 hours in a state where the supporting unit 30 was put in the vacuum adiabatic body, thereby measuring a vacuum maintenance performance of the supporting unit 30.

An initial exhaust performance of LCP is best, but its vacuum maintenance performance is bad. This may be caused by sensitivity of the LCP to temperature. Also, it is expected through characteristics of the graph that, when a final allowable pressure is $5 \times 10^{-3}$ Torr, its vacuum performance will be maintained for a time of about 0.5 years. Therefore, the LCP may not be used as the material of the supporting unit 30.

Regarding glass fiber PC (G/F PC), its exhaust speed is fast, but its vacuum maintenance performance is low. It is determined that this will be influenced by an additive. Also, it is expected through the characteristics of the graph that the glass fiber PC will maintain its vacuum performance under the same conditions for a time of about 8.2 years. Therefore, PC (G/F PC) may not be used as the material of the supporting unit 30.

It is expected that, in the case of the low outgassing PC (O/G PC), its vacuum maintenance performance is excellent, and its vacuum performance will be maintained under the same conditions for a time of about 34 years, as compared with the above-described two materials. However, it may be seen that the initial exhaust performance of the low outgassing PC is low, and therefore, the fabrication efficiency of the low outgassing PC is lowered.

It may be seen that, in the case of the PPS, its vacuum maintenance performance is remarkably excellent, and its exhaust performance is also excellent. Based on the vacuum maintenance performance, PPS may be used as the material of the supporting unit 30.

Figure 6A:
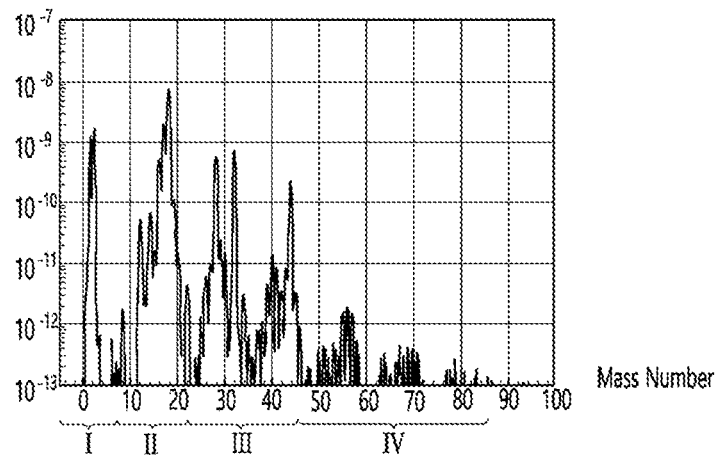
FIGS. 6A-6C illustrate results obtained by analyzing components of gases discharged from a PPS and a low outgassing PC.
Figure 6B:
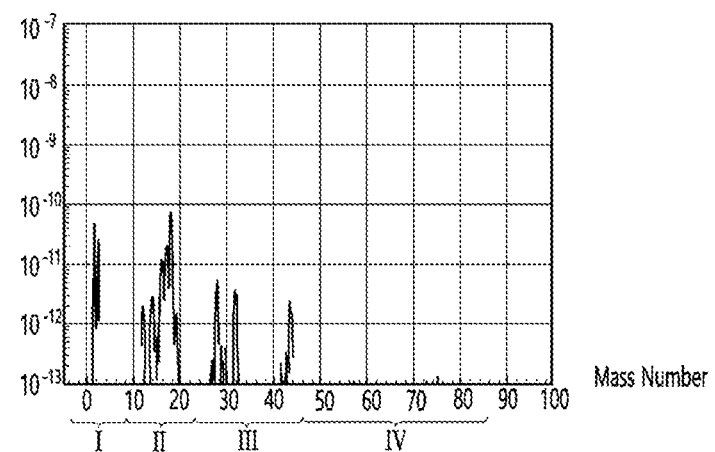
Figure 6C:
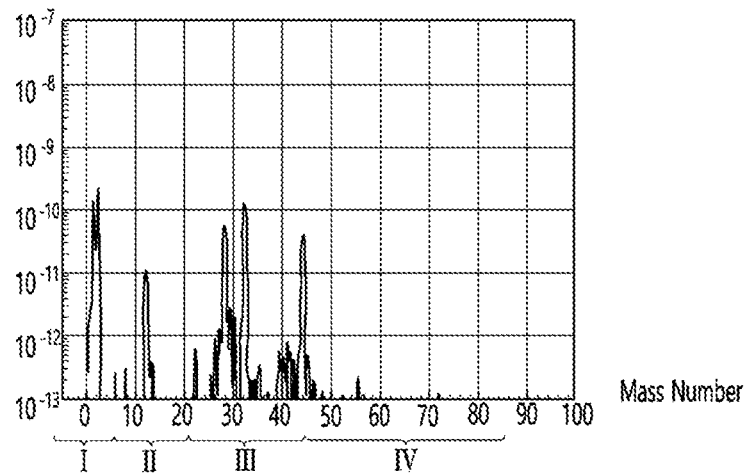

FIGS. 6A-6C illustrate results obtained by analyzing components of gases discharged from the PPS and the low outgassing PC, in which the horizontal axis represents mass numbers of gases and the vertical axis represents concentrations of gases. FIG. 6A illustrates a result obtained by analyzing a gas discharged from the low outgassing PC. In FIG. 6A, it may be seen that hydrogen or $H_2$ series (I), water or $H_2O$ series (II), dinitrogen/carbon monoxide/carbon dioxide/oxygen or $N_2/CO/CO_2/O_2$ series (III), and hydrocarbon series (IV) are equally discharged. FIG. 6B illustrates a result obtained by analyzing a gas discharged from the PPS. In FIG. 6B, it may be seen that the $H_2$ series (I), $H_2O$ series (II), and $N_2/CO/CO_2/O_2$ series (III) are discharged to a weak extent. FIG. 6C is a result obtained by analyzing a gas discharged from stainless steel. In FIG. 6C, it may be seen that a similar gas to the PPS is discharged from the stainless steel. Consequently, it may be seen that the PPS discharges a similar gas to the stainless steel.

As the analyzed result, it may be re-confirmed that the PPS is excellent as the material of the supporting unit 30.

To further reinforce the strength of the supporting unit 30, a material added with glass fiber (G/F) of several tens %, such as G/F of 40% together with the PPS, may be used. To further increase in strength of a PPS+G/F 40% material used in the supporting unit 30, the PPS+G/F 40% material may be further subjected to a crystallization process (left under an atmosphere of 150° C. or more for about 1 hour) as a post-treatment process after injection.

FIG. 7 illustrates results obtained by measuring maximum deformation temperatures at which resins are damaged by atmospheric pressure in high-temperature exhaustion. At this time, the bars 31 were provided at a diameter of 2 mm at a distance of 30 mm. Referring to FIG. 7, it may be seen that a rupture occurs at 60° C. in the case of the PE, a rupture occurs at 90° C. in the case of the low outgassing PC, and a rupture occurs at 125° C. in the case of the PPS.

As the analyzed result, it may be seen that the PPS may be used as the resin used inside the vacuum space part 50. However, the low outgassing PC may be used in terms of fabrication cost.

Referring back to FIG. 3A, a radiation resistance sheet 32 to reduce heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be used as the material of the radiation resistance sheet 32. In an embodiment, an aluminum foil having an emissivity of 0.02 may be used as the radiation resistance sheet 32. Also, since the transfer of radiation heat may not be sufficiently blocked using one radiation resistance sheet 32, at least two radiation resistance sheets 32 may be provided at a certain distance so as not to contact each other. Also, at least one radiation resistance sheet 32 may be provided in a state in which it contacts the inner surface of the first or second plate member 10 or 20.

Referring to FIG. 3B, the distance between the plate members 10 and 20 is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer.

In the present embodiment, the vacuum adiabatic body may be manufactured without the radiation resistance sheet 32.

Figure 3C:
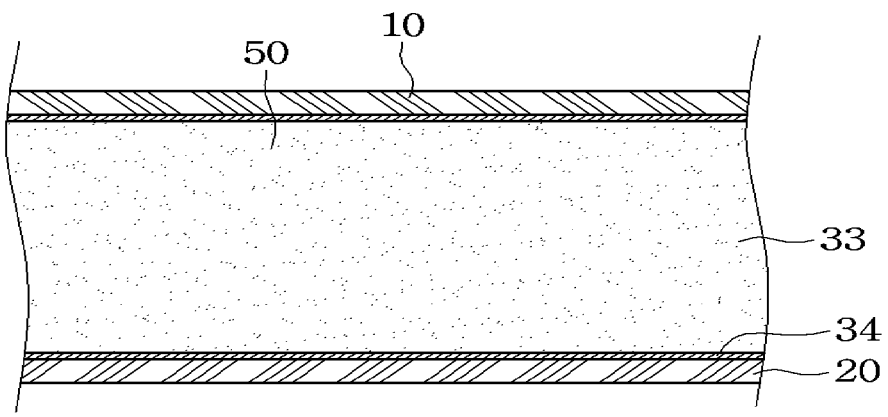

Referring to FIG. 3C, the supporting unit 30 to maintain the vacuum space part 50 may not be provided. A porous material 333 may be provided to be surrounded by a film 34 instead of the supporting unit 30. Here, the porous material 33 may be provided in a state of being compressed so that the gap of the vacuum space part 50 is maintained. The film 34 made of, for example, a PE material provided in a state in which a hole is punched in the film 34.

In the present embodiment, the vacuum adiabatic body may be manufactured without the supporting unit 30. That is to say, the porous material 33 may perform the function of the radiation resistance sheet 32 and the function of the supporting unit 30 together.

Figure 8A:
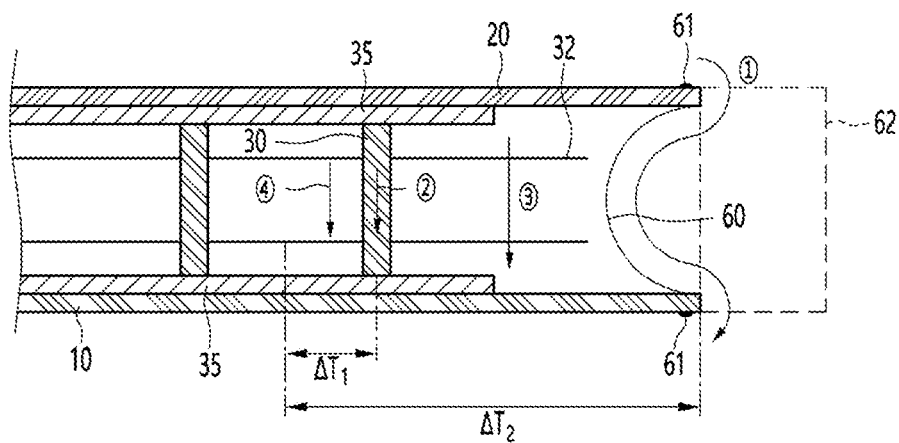
FIGS. 8A-8C are views showing various embodiments of conductive resistance sheets and peripheral parts thereof.
Figure 8B:
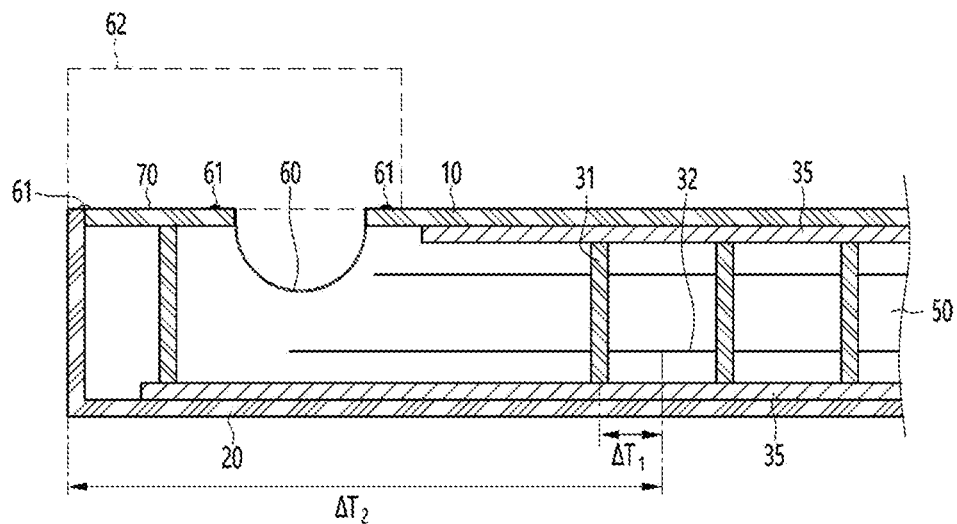
Figure 8C:
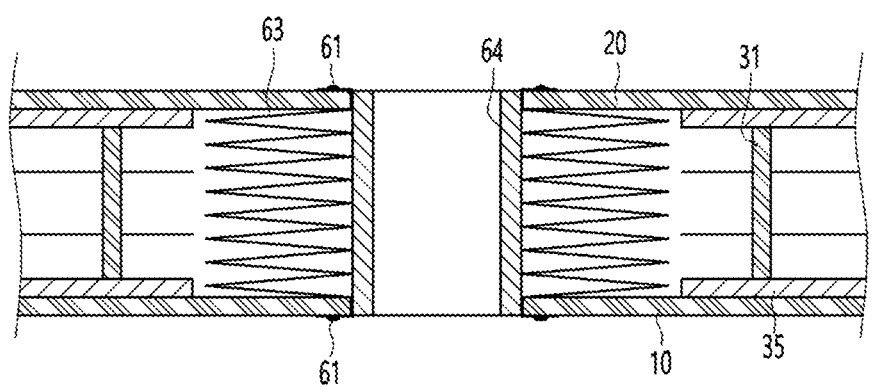

FIGS. 8A-8C are views showing various embodiments of conductive resistance sheets 60 or 63 and peripheral parts thereof. Structures of the conductive resistance sheets 60 or 63 are briefly illustrated in FIG. 2, but will be understood in detail with reference to the drawings.

First, a conductive resistance sheet 60 proposed in FIG. 8A may be applied to the main body-side vacuum adiabatic body. Specifically, the first and second plate members 10 and 20 may be sealed so as to vacuumize the interior of the vacuum adiabatic body. In this case, since the first and second plate members 10 and 20 have different temperatures from each other, heat transfer may occur between the first and second plate members 10 and 20. A conductive resistance sheet 60 is provided to prevent heat conduction between two different kinds of plate members 10 and 20.

The conductive resistance sheet 60 may be provided with sealing or welding parts 61 at which both ends of the conductive resistance sheet 60 are sealed to define at least one portion of the wall for the third space or vacuum space part 50 and maintain the vacuum state. The conductive resistance sheet 60 may be provided as a thin foil in unit of micrometer so as to reduce the amount of heat conducted along the wall for the vacuum space part 50. The sealing parts 610 may be provided as welding parts, and the conductive resistance sheet 60 and the plate members 10 and 20 may be fused to each other. In order to cause a fusing action between the conductive resistance sheet 60 and the first and second plate members 10 and 20, the conductive resistance sheet 60 and the first and second plate members 10 and 20 may be made of the same material (e.g., a stainless material). The sealing parts 610 are not limited to the welding parts, and may be provided through a process such as cocking. The conductive resistance sheet 60 may be provided in a curved shape. Thus, a thermal conduction distance of the conductive resistance sheet 60 is provided longer than the linear distance of each plate member 10 and 20, so that the amount of thermal conduction may be further reduced.

A change in temperature occurs along the conductive resistance sheet 60. Therefore, in order to block heat transfer to the exterior of the conductive resistance sheet 60, a shielding part or cover 62 may be provided at the exterior of the conductive resistance sheet 60 such that an adiabatic action occurs. In other words, in the refrigerator 1, the second plate member 20 has a high temperature and the first plate member 10 has a low temperature. In addition, thermal conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 may not serve as a conductive resistor at the exposed portion.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body 2 and the door 3 are opened, the shielding part 62 may be provided as a porous material or a separate adiabatic structure.

A conductive resistance sheet 60 proposed in FIG. 8B may be applied to the door-side vacuum adiabatic body. In FIG. 8B, portions different from those of FIG. 8A are described in detail, and the same description is applied to portions identical to those of FIG. 8A. A side frame 70 is further provided at an outside of the conductive resistance sheet 60. A part or seal to seal between the door 3 and the main body 2, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end portion of the vacuum space part 50, i.e., a corner side portion of the vacuum space part 50. This is because, unlike the main body 2, a corner edge portion of the door 3 is exposed to the exterior. In more detail, if the conductive resistance sheet 60 is placed at the front end portion of the vacuum space part 50, the corner edge portion of the door 3 is exposed to the exterior, and hence there is a disadvantage in that a separate adiabatic part should be configured so as to thermally insulate the conductive resistance sheet 60.

A conductive resistance sheet 63 proposed in FIG. 8C may be installed in the pipeline 64 passing through the vacuum space part 50. In FIG. 8C, portions different from those of FIGS. 8A and 8b are described in detail, and the same description is applied to portions identical to those of FIGS. 8A and 8B. A conductive resistance sheet 63 having a similar shape as that of FIG. 8A, such as a wrinkled or zig-zag conductive resistance sheet 63, may be provided at a peripheral portion of the pipeline 64. Accordingly, a heat transfer path may be lengthened, and deformation caused by a pressure difference may be prevented. In addition, a separate shielding part may be provided to improve the adiabatic performance of the conductive resistance sheet.

A heat transfer path between the first and second plate members 10 and 20 will be described with reference back to FIG. 8A. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various depending on various design dimensions. For example, the supporting unit 30 may be changed such that the first and second plate members 10 and 20 may endure a vacuum pressure without being deformed, the vacuum pressure may be changed, the distance between the first and second plate members 10 and 20 may be changed, and the length of the conductive resistance sheet 60 or 63 may be changed. The transfer heat may be changed depending on a difference in temperature between the spaces (the first and second spaces) respectively provided by the plate members 10 and 20. In the embodiment, a configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ may become the smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is the largest. For example, the heat transfer amount by the solid conduction heat may reach 75% of the total heat transfer amount. A heat transfer amount by the radiation transfer heat ③ is smaller than the heat transfer amount by the solid conduction heat but larger than the heat transfer amount of the gas conduction heat. For example, the heat transfer amount by the radiation transfer heat ③ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math Equation 1.

$$eK_{solid\ conduction\ heat} > eK_{radiation\ transfer\ heat} > eK_{gas\ conduction\ heat} \qquad \text{Equation 1}$$

Here, the effective heat transfer coefficient (eK) is a value that may be measured using a shape and temperature differences of a target product. The effective heat transfer coefficient (eK) is a value that may be obtained by measuring a total heat transfer amount and a temperature at least one portion at which heat is transferred. For example, a calorific value (W) is measured using a heating source that may be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area ($m^2$) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet 60 or 63, and a thermal conductivity (k) of the conductive resistance sheet 60 or 63 (the thermal conductivity of the conductive resistance sheet is a material property of a material and may be obtained in advance). For the supporter conduction heat, a conductive calorific value may be obtained through a temperature difference (ΔT) between an entrance and an exit of the supporting unit 30, a sectional area (A) of the supporting unit 30, a length (L) of the supporting unit 30, and a thermal conductivity (k) of the supporting unit 30. Here, the thermal conductivity of the supporting unit 30 is a material property of a material and may be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat may be changed depending on various variables including a kind, an amount, and the like of the porous material.

According to an embodiment, a temperature difference $\Delta T_1$ between a geometric center formed by adjacent bars 31 and a point at which each of the bars 31 is located may be provided to be less than 0.5° C. Also, a temperature difference $\Delta T_2$ between the geometric center formed by the adjacent bars 31 and an edge portion of the vacuum adiabatic body may be provided to be less than 0.5° C. In the second plate member 20, a temperature difference between an average temperature of the second plate member 20 and a temperature at a point at which a heat transfer path passing through the conductive resistance sheet 60 or 63 meets the second plate member 20 may be the largest. For example, when the second space is a region hotter than the first space, the temperature at the point at which the heat transfer path passing through the conductive resistance sheet 60 or 63 meets the second plate member 20 becomes lowest. Similarly, when the second space is a region colder than the first space, the temperature at the point at which the heat transfer path passing through the conductive resistance sheet 60 or 63 meets the second plate member 20 becomes highest.

This means that the amount of heat transferred through other points except the surface conduction heat passing through the conductive resistance sheet 60 or 63 should be controlled, and the entire heat transfer amount satisfying the vacuum adiabatic body may be achieved only when the surface conduction heat occupies the largest heat transfer amount. To this end, a temperature variation of the conductive resistance sheet 60 or 63 may be controlled to be larger than that of the plate members 10 and 20.

Physical characteristics of the parts constituting the vacuum adiabatic body will be described. In the vacuum adiabatic body, a force by vacuum pressure is applied to all of the parts. Therefore, a material having a strength (N/m²) of a certain level may be used.

Under such conditions, the plate members 10 and 20 and the side frame 70 may be made of a material having a sufficient strength with which they are not damaged by even vacuum pressure. For example, when the number of bars 31 is decreased so as to limit the support conduction heat, deformation of the plate members 10 and 20 may occur due to the vacuum pressure, which may bad influence on the external appearance of refrigerator. The radiation resistance sheet 32 may be made of a material that has a low emissivity and may be easily subjected to thin film processing. Also, the radiation resistance sheet 32 is to ensure a strength strong enough not to be deformed by an external impact. The supporting unit 30 is provided with a strength strong enough to support the force by the vacuum pressure and endure an external impact, and is to have machinability. The conductive resistance sheet 60 may be made of a material that has a thin plate shape and may endure the vacuum pressure.

In an embodiment, the plate members 10 and 20, the side frame 70, and the conductive resistance sheet 60 or 63 may be made of stainless materials having the same strength. The radiation resistance sheet 32 may be made of aluminum having a weaker strength that the stainless materials. The supporting unit 30 may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a high or predetermined strength, but the stiffness of the material may be low so as to increase heat resistance and minimize radiation heat as the conductive resistance sheet 60 or 63 is uniformly spread without any roughness when the vacuum pressure is applied. The radiation resistance sheet 32 requires a stiffness of a certain level so as not to contact another part due to deformation. Particularly, an edge portion of the radiation resistance sheet 32 may generate conduction heat due to drooping caused by the self-load of the radiation resistance sheet 32. Therefore, a stiffness of a certain level is required. The supporting unit 30 may require a stiffness strong enough to endure a compressive stress from the plate members 10 and 20 and an external impact.

In an embodiment, the plate members 10 and 20 and the side frame 70 may have the highest stiffness so as to prevent deformation caused by the vacuum pressure. The supporting unit 30, particularly, the bar 31 may have the second highest stiffness. The radiation resistance sheet 32 may have a stiffness that is lower than that of the supporting unit 30 but higher than that of the conductive resistance sheet 60 or 63. Lastly, the conductive resistance sheet 60 or 63 may be made of a material that is easily deformed by the vacuum pressure and has the lowest stiffness.

Even when the porous material 33 is filled in the vacuum space part 50, the conductive resistance sheet 60 or 63 may have the lowest stiffness, and the plate members 10 and 20 and the side frame 70 may have the highest stiffness.

The vacuum space part 50 may resist heat transfer by only the supporting unit 30. Here, a porous material 33 may be filled with the supporting unit 30 inside the vacuum space part 50 to resist to the heat transfer. The heat transfer to the porous material 33 may resist without applying the supporting unit 30.

In the above description, as a material suitable for the supporting unit 30, a resin of PPS has been proposed. The bar 31 is provided on the support plate 35 at gaps of 2 cm to 3 cm, and the bar 31 has a height of 1 cm to 2 cm. These resins often have poor fluidity of the resin during the molding. In many cases, the molded article does not have the designed value. Particularly, the shape of a molded product such as a bar 31 having a short length is often not provided properly due to non-uniform injection of resin into a part far from the liquid injection port of the liquid.

This may cause damage of the supporting unit 30 or a defective vacuum adiabatic body later.

The supporting unit 30 is a substantially two-dimensional structure, but its area is considerably large. Therefore, if a defect occurs in one of the portions, it is difficult to discard the entire structure. This limitation becomes even more pronounced as refrigerators and warming apparatus are becoming larger in size to meet the needs of consumers.

Referring to FIG. 9, the vacuum adiabatic body may be applied to the main body of the refrigerator. In this case, a refrigerant pipe connecting the evaporator provided inside the refrigerator, i.e., in the first space, to the condenser provided outside the refrigerator, i.e., in the second space, may pass through the vacuum adiabatic body. The refrigerant pipe may be provided as a heat exchange pipeline 117.

The heat exchange pipeline 117 may be provided by bonding an inlet pipe 171 through which the refrigerant is introduced into an evaporator provided in the refrigerator to an outlet pipe 172 through which the refrigerant is discharged from the evaporator. Two pipelines that are the inlet pipe 171 and the outlet pipe 172 may be bonded to each other through welding. The refrigerant flowing through the inlet pipe 171 and the outlet pipe 172 may be heat-exchanged with each other to improve efficiency of a refrigeration cycle.

According to an embodiment, the heat exchange pipeline 117 may be provided outside the vacuum space part 50. The heat exchange pipeline may not be provided in the narrow vacuum space part 50 to prevent the heat exchange pipeline 117 from negatively impacting a vacuum state of the vacuum space part 50, and significant effort in installing the heat exchange pipeline 117 into the narrow vacuum space part 50 may be unnecessary.

In the following embodiments, the heat exchange pipeline refers to a pipeline area on which an inlet pipe and an outlet pipe intensively contact each other to allow the refrigerant to be heat-exchanged with each other. Although the heat exchange is performed in other areas for additional heat exchange within the range of engineering margins, it may be understood that an amount of heat exchange is relatively small. In some cases, it is understood that the heat exchange pipeline is additionally provided elsewhere, but in the embodiment, it is understood that the pipeline for the heat exchange is placed in a region that is called a heat exchange pipeline.

FIG. 9 is a view illustrating a configuration of an installation part of the heat exchange pipeline according to an embodiment.

Referring to FIG. 9, the first plate member 10 and the second plate member 20 are provided, and a vacuum space part 50 is provided between the plate members 10 and 20. The first plate member 10 may be used as a low-temperature side wall of the refrigerator, and the second plate member 20 may be used as a high-temperature side wall of the refrigerator.

A heat exchange pipeline 117 may pass through a wall of the vacuum adiabatic body. That is to say, the heat exchange pipeline 117 may linearly pass through the first plate member 10, the vacuum space part 50, and the second plate member 20 and then be withdrawn from one space to the other space with respect to the vacuum adiabatic body. The plate members 10 and 20 through which the heat exchange pipeline 117 passes may be the same point with respect to the vacuum adiabatic body. The heat exchange pipeline 117 may not be disposed in the vacuum space part 50. When the vacuum adiabatic body is applied to the refrigerator, the vacuum adiabatic body may be withdrawn from the inside to the outside of the refrigerator.

The through-part or opening through which the heat exchange pipeline 117 passes through the wall of the vacuum adiabatic body may be sealed by a through sealing part or sealing assembly 300. The through-part may be defined as a portion in which the plate members 10 and 20 are opened so that the refrigerant pipe passes therethrough. The heat exchange pipeline 117 may pass through the vacuum adiabatic body without vacuum breakage of the vacuum space part 50 and the adiabatic loss by the through sealing part 300. The through sealing part 300 will be described below in more detail with reference to other drawings.

The heat exchange pipeline 117 that is withdrawn to the outside may be configured so that an inlet pipe 171 and an outlet pipe 172 (FIG. 16) are heat-exchanged with each other in a predetermined space that is partitioned from the outside by a pipeline adiabatic case 302. The heat exchange pipeline 117 may have a bent or rolled shape so that the heat exchange pipeline 117 is intensively heat-exchanged within the pipeline adiabatic case 302.

The inside of the pipeline adiabatic case 302 may be provided as or with a pipeline adiabatic part or space 301 so that the inlet pipe 171 and the outlet pipe 172, which constitute the heat exchange pipeline 117 (FIG. 16), are heat-exchanged with each other to prevent the adiabatic loss due to the heat exchange with the outside. The pipeline adiabatic part 301 may perform an adiabatic function through vacuum, adiabatic foam, and air that is blocked from the outside. Alternatively, since the pipeline adiabatic case 302 is partitioned into the inside and outside thereof by itself, the pipeline adiabatic case 302 may perform the adiabatic function through the shielding.

The pipeline adiabatic case 302 may be installed on or at the second plate member 20, and the outer surface of the second plate member 20 may be provided as one wall of the pipeline adiabatic part 301. However, this embodiment is not limited thereto. For example, the pipeline adiabatic case 302 may be installed at a side of the first plate member 10, and the inner surface of the first plate member 10 may be provided as one wall of the pipeline adiabatic part 301. However, in this case, the space within the refrigerator may be narrowed.

At least the through sealing part 300 may be provided inside the pipeline adiabatic part 301 and the pipeline adiabatic case 302. That is to say, the through sealing part 300 may not be exposed to the outside and may be covered by the pipeline adiabatic part 301 and the pipeline adiabatic case 302.

The heat propagating along the heat exchange pipeline 117 may cause the adiabatic loss. For example, the vacuum breakage or disruption to a vacuum state of the vacuum space part 50 may not occur by the through sealing part 300, and an air flow to the outside of the refrigerator may be blocked to reduce the adiabatic loss. However, a case in which heat conducted to the inside of the refrigerator along the heat exchange pipeline 117 by using the first plate member 10 as a boundary is not sufficiently blocked may occur in designing a refrigeration system. In this case, the pipeline adiabatic part 301 and the pipeline adiabatic case 302 may be further installed at a side of the first plate member 10. In some cases, a small-sized adiabatic member rather than a large-sized configuration reaching the pipeline adiabatic part 301 and the pipeline adiabatic case 302 may be implemented. It is to be understood that the adiabatic member is provided on both the plate members 10 and 20 in the following other embodiments.

However, the adiabatic loss affected in the inside of the refrigerator may be reduced by only the pipeline adiabatic part 301 and the pipeline adiabatic case 302, which are provided inside the second plate member 20, through sufficient examination of the refrigeration system.

According to this embodiment, the influence exerted on the vacuum space part 50 by the heat exchange pipeline 117 may be reduced in the beginning or at installation, and the limitation in which the vacuum adiabatic body is not repaired later due to the sealing of the vacuum adiabatic body may be solved.

FIG. 10 is a view of the refrigerant to which the installation part of the heat exchange pipeline of FIG. 9 is applied according to an embodiment. In the refrigerator of FIG. 10, the single vacuum adiabatic body is divided into two spaces by a partition wall 350. The two spaces may be opened and closed by separate doors, and a single evaporator may be provided to supply cold air into the two spaces.

Referring to FIG. 10, a single main body 2 provided by the single adiabatic body may be divided into two spaces, and the two spaces may be opened and closed by separate doors 3. The two spaces may operate in an upper-refrigerating and lower-freezing manner. The partition wall 350 may be provided in at least one of a manner in which an adiabatic unit that is a foaming member is filled or a shield manner in which an inner space is shielded from the outside.

An evaporator 7 may be provided in the freezing space of the two spaces. The cold air supplied to the evaporator 7 may be supplied from the inlet pipe 171 (FIG. 16) via a compressor 4 and a condenser 5. The inlet pipe 171 may serve as an expansion device. A refrigerant evaporated in the evaporator 7 is discharged through the outlet pipe 172 (FIG. 16). It has already been explained that the heat exchange pipeline 117 in which the inlet pipe 171 and the outlet pipe 172 are exchanged with each other is provided outside the refrigerator.

The heat exchange pipeline 117 is disposed in a separate space having one surface extending along the outer surface of the vacuum adiabatic body as a substantial wall outside the vacuum adiabatic body providing the wall of the refrigerator. The heat exchange pipeline 117 may be the same as the above-described heat exchange pipeline 117 in that the thermal insulation is realized by the pipeline adiabatic part 301 and the pipeline adiabatic case 302 (FIG. 9).

A cold air passage 351 may be provided in the partition wall 350. The cold air passage 351 may be a passage through which cold air generated in the evaporator 7 is transferred from the space, in which the evaporator 7 is disposed, to the other space. To remove defrosting water generated in the evaporator 7 to the outside of the main body 2, a defrosting water pipeline 352 may be further provided in the vacuum adiabatic body.

The through sealing part 300 may be provided on a position at which the heat exchange pipeline 117 passes through the main body 2 to prevent heat from being transferred to the inside and outside of the refrigerator. Also, the pipeline adiabatic part 301 and the pipeline adiabatic case 302 may cover the through sealing part 300 to more firmly prevent the cold air from being lost.

In FIG. 10, a thick solid line indicates a copper pipe, which has an inner diameter of about 3 millimeters or more. A thin solid line represents a thin pipeline having a diameter of about 1 millimeter or less as a capillary.

FIG. 11 is a more clear conceptual view of the embodiment of FIG. 10 with respect to a path of the heat exchange pipeline.

Referring to FIG. 11, the heat exchange pipeline 117 is shielded from the outside by the pipeline adiabatic part 301 and the pipeline adiabatic case 302, which are disposed on the outer surface of the vacuum adiabatic body 1. In this state, the inlet pipe 171 and the outlet pipe 172 (FIG. 16), which constitute the heat exchange pipeline 117, may be heat-exchanged with only each other to reduce the adiabatic loss.

The through sealing part 300 may be covered and protected by the pipeline adiabatic part 301 and the pipeline adiabatic case 302.

According to the above-described constituents, the heat exchange pipeline 117 may sufficiently generate thermal energy between the condenser C and the evaporator E to reuse the thermal energy.

Since the heat exchange pipeline is not disposed in the vacuum space part 50, the vacuum breakage of the vacuum space part 50 and the difficulty in repair of the heat exchange pipeline may be prevented in the beginning.

FIG. 12 is a view of a refrigerant to which an installation part of a heat exchange pipeline is applied according to another embodiment. Other constituents according to an embodiment of FIG. 12 are the same as those according to an embodiment of FIG. 10 except for installation of a heat exchange pipeline and a peripheral portion of the heat exchange pipeline, and thus, non-explained constituents will be derived from the descriptions of the embodiment of FIG. 10.

Referring to FIG. 12, a heat exchange pipeline 117 may be provided in a partition wall 350. For example, the heat exchange pipeline 117 may be provided within the partition wall 350. The partition wall 350 is configured to thermally insulate two spaces within a main body 2. Thus, a separate adiabatic constituent, which is provided as only the heat exchange pipeline 117, for example, a pipeline adiabatic part 301 and a pipeline adiabatic case 302 may not be separately provided. The constituents of the partition wall 350 may be provided as adiabatic constituents of the heat exchange pipeline 117.

The heat exchange pipeline 117 connected to the evaporator 7 may perform heat exchange between the inlet pipe 171 and the outlet pipe 172 (FIG. 16) in the partition wall 350 and then be withdrawn to the outside of a main body 2 by passing through a through sealing part 300.

In this embodiment, it is unnecessary to separately provide the pipeline adiabatic part 301 and the pipeline adiabatic case 302 outside the refrigerator. Thus, the inner and outer spaces of the refrigerator may be more efficiently utilized. In addition, since the adiabatic constituents of the partition wall 350 are used together with the adiabatic constituents of the heat exchange pipeline 117, the space utilization may be improved.

FIG. 13 is a more clear conceptual view of the embodiment of FIG. 12 with respect to a path of the heat exchange pipeline.

Referring to FIG. 13, the constituents of the partition wall 350 may serve as the adiabatic constituents of the heat exchange pipeline 117, respectively. As an outer surface structure of the partition wall 350, an outer case made of a resin material may act as the pipeline adiabatic case 302, and an adiabatic member made of a foamed resin material provided into the partition wall 350 may act as the pipeline adiabatic part 301.

The inlet pipe 171 and the outlet pipe 172 (FIG. 16), which constitute the heat exchange pipeline 117, may be heat-exchanged with only each other to reduce a adiabatic loss.

The through sealing part 300 may be covered and protected by the partition wall 350. As described above, a separate adiabatic structure may be provided at a side of the second plate member 20 adjacent to the through sealing part 300.

According to the above-described constituents, the heat exchange pipeline 117 may sufficiently generate thermal energy between the condenser C and the evaporator E to reuse the thermal energy.

According to the above-described constituents, since a constituent for separately installing the heat exchange pipeline outside the refrigerator is not required, the configuration may be simplified, and the refrigerator may be reduced in size. Alternatively, various advantages due to the absence of the heat exchange pipeline in the vacuum space part 50 may be obtained as in the previous embodiments.

FIG. 14 is a view of a refrigerant to which an installation part of a heat exchange pipeline is applied according to further another embodiment. Other constituents according to an embodiment of FIG. 14 are the same as those according to an embodiment of FIGS. 10 and 12 except for installation of a heat exchange pipeline and a peripheral portion of the heat exchange pipeline, and thus, non-explained constituents will be derived from the descriptions of the embodiment of FIGS. 10 and 12.

Referring to FIG. 14, in this embodiment, a heat exchange pipeline 117 is disposed in a machine room 8. Since the heat exchange pipeline 117 is disposed in an inner space of the machine room 8, the pipeline adiabatic part 301 and the pipeline adiabatic case 302 may be provided to sufficiently perform heat exchange between the two pipelines disposed in the heat exchange pipeline 117.

In this embodiment, a defrosting water pipeline 352 and a through sealing part 300, which are required for driving an evaporator 7, may be achieved by a single through-structure. An inlet pipe 171, an outlet pipe 172 (FIG. 16), and the defrosting water pipeline 352 may pass together through the single through sealing part 300 through which the vacuum adiabatic body passes. Thus, according to another embodiment, since the single through-part sufficiently serves as the through-parts, which are disposed to be spaced apart from each other at two positions, the adiabatic loss may be reduced, and the fear of failure due to the vacuum breakage may be reduced.

In this embodiment, since the heat exchange pipeline 117 is installed in the inner space of the machine room 8 (FIG. 2), the machine room 8 may be efficiently utilized, and the refrigerator may not increase in size, thereby more efficiently utilizing a space outside the refrigerator.

FIG. 15 is a more clear conceptual view of the embodiment of FIG. 14 with respect to a path of the heat exchange pipeline.

Referring to FIG. 15, the heat exchange pipeline 117 is disposed in the inner space of the machine room 8. The heat exchange pipeline 117 may perform heat exchange between the inlet pipe 171 and the outlet pipe 172 (FIG. 16) regardless of a thermal state of the machine room 8 (FIG. 2) by the pipeline adiabatic case 302 and the pipeline adiabatic part 301.

According to the above-described constituents, the heat exchange pipeline 117 may sufficiently generate thermal energy between the condenser C and the evaporator E to reuse the thermal energy. Particularly, a distance between the evaporator E and the condenser C may decrease. Thus, an irreversible loss such as pressure drop due to the unnecessary pipeline length may be reduced to improve efficiency of the refrigeration system, and an additional component for the insulation of the unnecessary pipeline may not be required.

FIG. 16 is a perspective view of a case in which a product is applied to the embodiment proposed in FIG. 15.

Referring to FIG. 16, the pipeline adiabatic part 301 and the pipeline adiabatic case 302 are disposed in the machine room 8, and the heat exchange pipeline 117 is disposed in the pipeline adiabatic case 302. The heat exchange pipeline 117 may be bent in a zigzag shape and extend in a direction of a plane of the plate member to secure a path for the heat exchange.

The through sealing part 300 may pass through the vacuum adiabatic body, and the heat exchange pipeline 117 may pass through the inside of the through sealing part 300. Although the defrosting water pipeline 352 (FIG. 14) passes through the through sealing part 300, this is not illustrated in the drawing.

The inlet pipe 171 providing one pipeline of the heat exchange pipeline 117 may be connected to the condenser 5 within the machine room 8 as a capillary, and the outlet pipe 172 providing the other pipeline may be connected to the compressor 4 as a copper pipeline having a large diameter.

In the embodiment of FIG. 16, when a temperature distribution of the pipeline adiabatic part 301 is observed, a temperature of the through sealing part 300 is low, and also, a temperature gradually increases in a direction in which the heat exchange pipeline 117 extends to the inside of the pipeline adiabatic part 301. In detail, in FIG. 16, the temperature of a right lower portion of the pipeline adiabatic part 301 on which the through sealing part 300 is disposed may be the lowest, and a temperature of a left lower portion may be the highest. In the above-described thermal arrangement, a non-uniform temperature distribution may occur in the pipeline adiabatic part 301 to deteriorate heat exchange efficiency of the heat exchange pipeline and significantly cause heat leakage.

FIG. 17 is a view illustrating an arrangement of the heat exchange pipeline in which the above-described limitation is solved.

Referring to FIG. 17, in the arrangement of the heat exchange pipeline 117, the through sealing part 300 may be provided at a center of the heat exchange pipeline 117 or at an end passing through the vacuum adiabatic body. A pipeline connected to the evaporator E (FIG. 15) may move through the through sealing part 300. In the arrangement of the heat exchange pipeline 117, the other point or end at which the heat exchange pipeline 117 is connected to the outside of the pipeline adiabatic part 301 may be provided at the outermost side. The heat exchange pipeline 117 may be wound in a spiral shape while gradually increasing in diameter with respect to a center of the through sealing part 300. According to the above-described configuration, a temperature of a central portion of the heat exchange pipeline 117 may be the lowest, and a temperature may gradually increase toward the outside. Thus, the pipeline adiabatic part 301 may have a uniform temperature distribution to improve heat exchange efficiency of the heat exchange pipeline and reduce a heat loss.

Since the inlet pipe 171 and the outlet pipe 172 (FIG. 16) generate a counter current flow in the heat exchange pipeline 117, a spacing part between the heat exchange pipelines 117 may be insulated by the pipeline adiabatic part 301 to prevent unnecessary heat exchange of the heat exchange pipeline 117 from occurring.

An arrow indicates a flow of an evaporated refrigerant flowing through the inside of the outlet pipe 172 that is withdrawn from the evaporator E having a low temperature.

In the embodiment of FIG. 17, an arrangement of a central portion having the lowest temperature (where a thermal influence of the outlet pipe 172 is most dominant) and the outermost portion having the highest temperature (where a thermal influence of the inlet pipe 171 is most dominant) may be optimized. In addition, the through sealing part 300 is disposed at the central portion, which passes through the first and second plate members 10 and 20, and the heat exchange pipeline 117 may be withdrawn to the outside while rotating or spiraling and have a diameter that gradually increases. The central portion may protrude outward from the spiral and be at one end of the spiral, while an outer portion, which may be at the other end of the spiral, passes through the pipeline adiabatic case 302. According to the arrangement of the heat exchange pipeline 117, the temperature distribution of the pipeline adiabatic part 301 may be radially uniform when viewed from the center. Thus, the heat exchange efficiency may be improved, and the heat leakage may be reduced.

In the arrangement of the heat exchange pipeline of FIG. 17, to obtain the bent efficiency, the pipeline adiabatic part 301 may be insulated.

FIG. 18 is a cross-sectional view for explaining an adiabatic structure of the heat exchange pipeline provided in FIG. 17.

Referring to FIG. 18, in the pipeline adiabatic part 301, the inner space of the pipeline adiabatic case 302 may be filled in a manner such as polystyrene foaming. The pipeline adiabatic part 301 may be configured so that the inlet pipe 171 and the outlet pipe 172, which constitute the heat exchange pipeline 117, may accurately perform counter current heat exchange at a predetermined position. In addition, the heat exchange pipeline 117 may be wound so a diameter thereof increases toward the outside to achieve thermal equilibrium.

Although the heat exchange pipeline 117 is shown to be wound to form one layer, the heat exchange pipeline 117 may alternatively be wound to form two layers or three layers.

FIG. 19 is a view for explaining another example of the adiabatic structure of the heat exchange pipeline of FIG. 17.

Referring to FIG. 19, the pipeline adiabatic part 301 may be provided in a vacuum state to provide a pipeline vacuum part or space 3011. A vacuum plate 3012 is additionally provided to a side of the second plate member 20 in the pipeline adiabatic case 302 to maintain the vacuum state within the pipeline vacuum part 3011. The vacuum plate 3012 may cover the through sealing part 300 to maintain sealing. As a result, the cold air within the refrigerator and an air pressure within the refrigerator may not have an influence on the pipeline vacuum part 3011.

Hereinafter, the through sealing part 300 will be described.

The through sealing part 300 may be a constitute that is installed at a point at which the heat exchange pipeline 117 passes through the vacuum adiabatic body and provided to prevent or reduce heat from being transferred to the inside and outside that are partitioned by the vacuum adiabatic body.

FIG. 20 is a cross-sectional view illustrating a configuration of the through sealing part 300.

Referring to FIG. 20, the vacuum space part 50 is provided in the spacing part between the plate members 10 and 20. A wrinkled conductive resistance sheet 63 illustrated in FIG. 8C may be provided at the through-parts or openings the plate members 10 and 20 The wrinkled conductive resistance sheet 63 may resist to thermal conduction between the plate members 10 and 20 and prevent the members 10 and 20 from being damaged by a pressure difference between a vacuum pressure and an atmospheric pressure. Both ends of the wrinkled conductive resistance sheet 63 may be welded to the plate members 10 and 20, and thermal conduction may be further prevented by the wrinkle shape of the wrinkled conductive resistance sheet 63.

The heat exchange pipeline 117 passes through an inner space of the wrinkled conductive resistance sheet 63. Blocks 310 and 320 may be disposed on upper and lower ends of the heat exchange pipeline 117 to block opened portions. A sealing member 330 may be provided inside of or between the blocks 310 and 320 to block a small ventilation.

The blocks 310 and 320 may be made of a soft material having a low heat conductive coefficient. The blocks 310 and 320 may be made of a material having a thermal conductivity less than that of each of the plate members 10 and 20 to resist to thermal conduction between the plate members.

Alternatively to the configuration as shown, he wrinkled conductive resistance sheet 63 may be implemented as a member or sheet having a small a large amount of wrinkles or ridges of a small size. For example, a flat thin plate-like member or an arc-shaped plate may be provided. A member connecting the through-part of the first plate member 10 to the through-part of the second plate member 20 to block vacuum leakage of the third space, that is a vacuum space, may be called a third plate member or a third plate.

One surface of the third plate member may be supported by the block 310 or 320 and the sealing member 330, and thus, heat transfer through the third plate may be blocked by the block and the sealing member.

The blocks 310 and 320 will be described in detail.

The blocks 310 and 320 may be provided as a pair of members, which perform the same function. Although any one member is described, the description may be equally applied to the other member.

An outer supporter 311, which contacts an outer surface of the first plate member 10 to seal a gap or opening formed in the first plate member 10 and/or to help seal the vacuum space part 50 between the first and second plate members 10 and 20 is provided in the first block 310 provided at a side of the first plate member 10, i.e., in the inside of the refrigerator. The heat exchange pipe 117 may be supported by a first surface provided inside the outer supporter 311, and the through-part may be supported within a second surface provided on a bottom surface of the outer supporter 311. The outer supporter 311 may serve to support the heat exchange pipe 117 and perform an operation so that the block 310 is supported at the through-part.

An inner pusher 312 having a size corresponding to a cross-sectional size of the wrinkled conductive resistance sheet 63 may be further provided inside the outer supporter 311.

The inner pusher 312 may compress a sealing member 330 to fill the inner space of the wrinkled conductive resistance sheet 63. The sealing member 330 may be made of a material that is curable after a predetermined time elapses as a fluid such as liquid silicon. According to the sealing member 330, the entire gap or vacuum space part 50 excluding the inner pushers 312 and 322 and the heat exchange pipeline 117 may be sealed in the inner space of the wrinkled conductive resistance sheet 63. A material having a thermal conductivity less than that of the plate members 10 and 20 may also be applied to the sealing member 330.

The description of the outer supporter 311 is similarly applied to the outer supporter 321 of the second block 320, and the description of the inner pusher 312 is similar for the inner pusher 322 of the second block 320.

The through sealing part 300 having the above-described structure may shield a flow and heat transfer of a gas passing through the inside and the outside of the vacuum adiabatic body even though the heat exchange pipeline 117 passes through the vacuum adiabatic body.

When the block 310 or 320 blocks the thermal conduction between the heat exchange pipe 117 and the third plate member and completely seals the heat exchange pipe 117 and the third plate member so that air does not pass, the sealing member 330 may be omitted. In this case, only the block 310 or 320 may be called a sealing member. Here, when the block 310 or 320 is initially applied, a synthetic resin having plasticity may be applied.

When the leakage of the cold air of the first space is not prevented by using only the blocks 310 and 320, the sealing member 330 may be applied. In this case, both the blocks 310 and 320 and the sealing member 330 may be called a sealing member or system. Here, the blocks 310 and 320 may mainly block thermal conduction, and the sealing member 330 may mainly prevent or reduce cold air leakage.

The descriptions of the blocks 310 and 320 and the sealing member 330 may be equally applied to other embodiments with respect to the through sealing part.

FIGS. 21A, 21B, 22A, and 22B are views illustrating a process of manufacturing the through sealing part 300.

First, referring to FIGS. 21A and 21B, an FIG. 21A illustrates a side view, and FIG. 21B illustrates a plan view.

The blocks 310 and 320 may be divided into first or one-side blocks 3101 and 3201 and second or the other side blocks 3102 and 3202. The first block 310 will be described as an example, and the same description will be equally applied to the second block 320.

The first block 310 may be divided into one-side block 3101 and the other-side block 3102 to surround the heat exchange pipeline 117. When the first block 310 is provided as a single body, the first block may be inserted from an end of the heat exchange pipeline 117 so as to be guided to a proper position. However, it is not desirable because it causes difficulty in work. In FIG. 21B, arrows indicate that one-side block 3101 and the other-side block 3102 are approaching to the heat exchange pipeline 117 to surround the heat exchange pipeline 117. Predetermined grooves 3103 and 3104 may be defined in the blocks so that the one-side block and the other-side block surround the heat exchange pipeline 117.

In FIG. 21B, dotted lines indicate the corresponding positions of a vertical cross-section and a horizontal cross-section, and a relative position of the heat exchange pipeline 117 and the blocks 310 and 320 may be understood together.

A sealing member 330 may be inserted as a fluid in the inner space of the wrinkled conductive resistance sheet 63. The sealing member 330 may be provided to surround an outer surface of the heat exchange pipeline 117. The sealing member 330 may prevent the heat exchange pipeline 117 from contacting the wrinkled conductive resistance sheet 63 to sufficiently perform the function of the thermal conductive resistance by the conductive resistance sheet 53. Thereafter, the blocks 310 and 320 are pushed into the wrinkled conductive resistance sheet 63. Explanation will be given while changing the drawing.

Referring to FIGS. 22A and 22B, FIG. 22A illustrates a side view, and FIG. 22B illustrates a plan view.

The first and second blocks 310 and 320 are inserted into the wrinkled conductive resistance sheet 63. An arrow indicates a moving direction of the blocks 310 and 320.

Since the first and second blocks 310 and 320 are at least partially inserted into the wrinkled conductive resistance sheet 63, the sealing member 330 may be deformed to move to a spacing part or gap between the heat exchange pipe 117 and the conductive resistance sheet 63 so as to be filled into the spacing part. Here, the inner pushers 312 and 322 may perform a function of a plunger that pushes and compresses the sealing member 330.

When the blocks 310 and 320 are sufficiently inserted into the wrinkled conductive resistance sheet 63, the sealing member 330 may be filled into the spacing part between the grooves 3103 and 3104 of the blocks and the heat exchange pipeline 117. Since the heat exchange pipeline 117 may be provided as a pair of pipes 171 and 172, it may be difficult to provide the grooves 3013 and 3104 so as to match outer appearances of the pipes 171 and 172. Due to this limitation, the sealing member 330 may be convenient in terms of production to prevent a gap between the grooves of the blocks 310 and 320 and the heat exchange pipeline 117 from occurring. The sealing member 330 may be an adhesive so that the blocks 310 and 320 are coupled to each other.

An arrow of FIG. 22 indicates that the inner pushers 312 and 322 push the sealing member 330 to seal the inside of the wrinkled conductive resistance sheet 63.

According to the through sealing part 300, the heat exchange pipeline 117 may perform the sealing on the inside and outside of a portion at which the heat exchange pipeline 117 passes through the vacuum adiabatic body, and heat transfer between the inside and the outside of the vacuum adiabatic body may be reduced.

The through sealing part 300 may block heat transferred through the through-part of the vacuum adiabatic body together with the pipeline adiabatic part 301. A mutual relationship between the through sealing part 300 and the pipeline adiabatic part 301 will be described by changing the drawing.

FIGS. 23 to 26 are views illustrating the mutual relationship between the through sealing part 300 and the pipeline adiabatic part 301.

Figure 23:
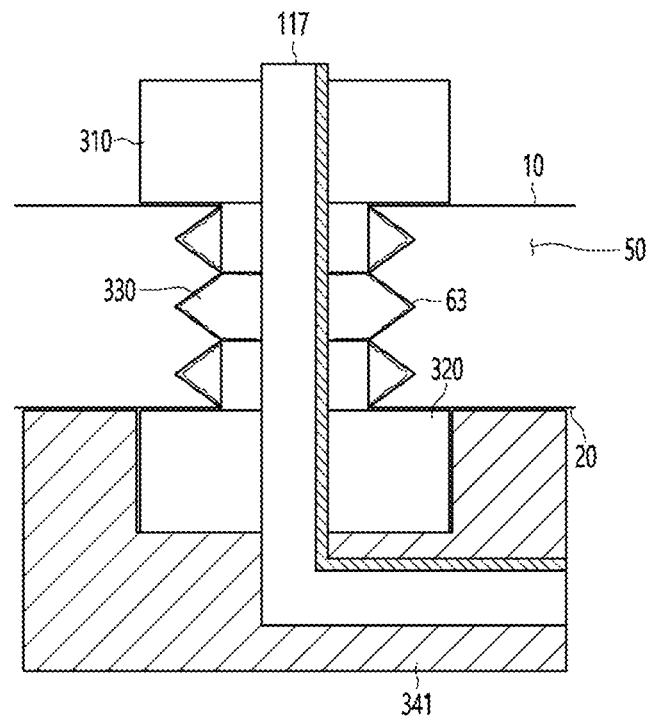
FIGS. 23 to 26 are views illustrating a mutual relationship between the through sealing part and the pipeline adiabatic part.

First, referring to FIG. 23, the pipeline adiabatic part 301 may provide a forward pipeline adiabatic part or space 341 having the through sealing part 300 at a center thereof. The adiabatic part 341 may expand in a forward direction along a plane perpendicular or forward from the plate member 20, while a portion of the heat exchange pipeline 117 may spiral inside of a plane that is parallel to a plane along the second plate member 20, as previously described with reference to FIG. 17. The forward pipeline adiabatic part 341 may be preferably applied to the heat exchange pipeline of FIG. 17.

The forward pipeline adiabatic part 341 may be attached to or provided at the second block 320 and/or the second plate member 20 and/or the heat exchange pipeline 117 or be foamed into an inner space of a predetermined case.

Figure 24:
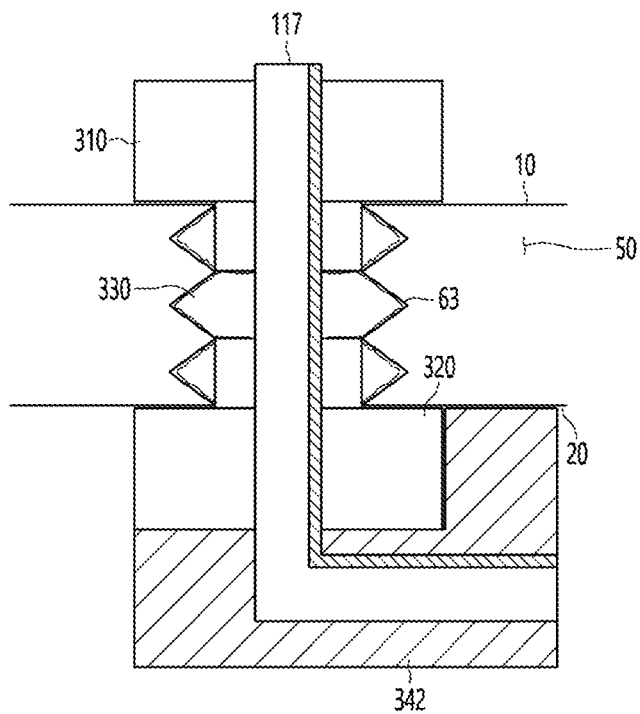

Referring to FIG. 24, the pipeline adiabatic part 301 may provide a one-way pipeline adiabatic part or space 342 extending in one direction of the through sealing part 300. The one-way pipeline adiabatic part 342 may be preferably applied to the heat exchange pipeline 117 of FIG. 16.

The one-way pipeline adiabatic part 341 may be attached to or provided at the second block 320 and/or the second plate member 20 and/or the heat exchange pipeline 117 or be foamed into an inner space of a predetermined case.

Figure 25:
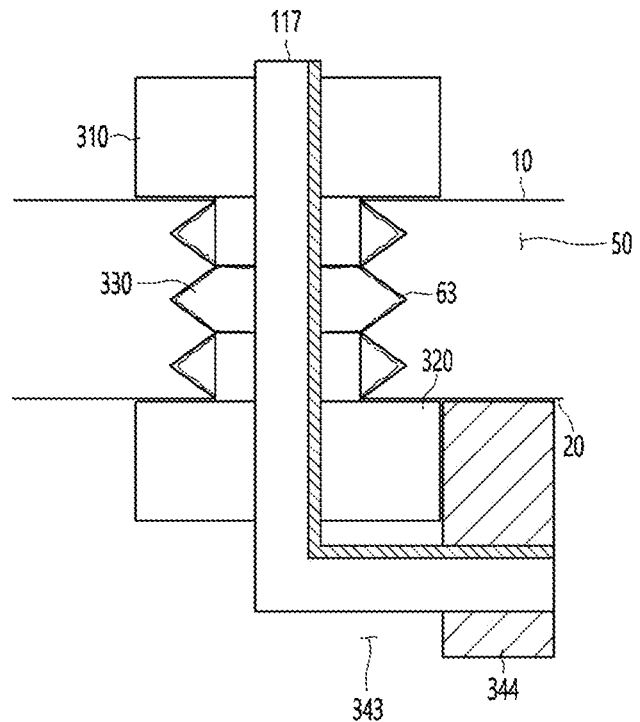

Referring to FIG. 25, the pipeline adiabatic part 301 may provide a one-side adiabatic part or space 344 provided at one side along the heat exchange pipeline 117 apart from the through sealing part 300. The one-side adiabatic part 344 may be fixed to the block 320 and/or the heat exchange pipeline 117 and/or the second plate member 20.

The other space through which the heat exchange pipeline 117 passes may provide an opening adiabatic part or space 343 so that the other space is separated from the vacuum space 50 and other spaces by the pipeline adiabatic case 302 to perform an adiabatic function.

Figure 26:
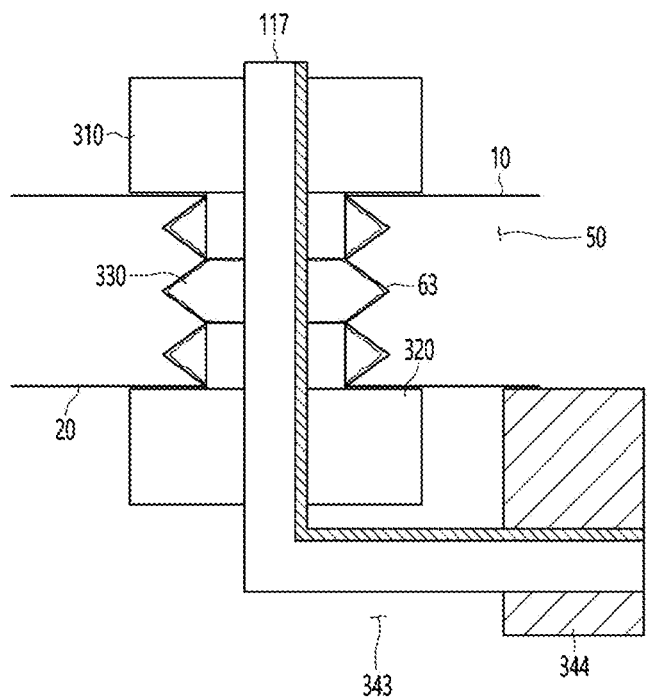

Referring to FIG. 26, unlike the case of FIG. 26, the one-side adiabatic part 344 may be provided to be separated from the block 320. This case may be applied to a case in which additional heat exchange between the inlet pipe 171 and the outlet pipe 172 is required when the heat exchange performance of the heat exchange pipeline 117 is insufficient.

The cases of FIGS. 25 and 26 may be preferably applied to obtain the adiabatic effect as a simple constitute when the thermal insulation to the first plate member 10 is required.

FIGS. 27 and 28 are views of a through sealing part 300 according to another embodiment.

Referring to FIG. 27, this embodiment is different from the embodiment of FIG. 20 in that male and female blocks are engaged with each other, and the sealing member 330 is changed to a sealer such as an O-ring. The description related to FIG. 20 may be applied as it is without any specific explanation.

A first block 360 may be disposed at a side of a first plate member 10, and a second block 370 may be disposed at a side of a second plate member 20. Since the blocks 360 and 370 are similar to each other, one will be described, and the same description will be applied to other blocks as well.

In the first block 360, an outer supporter 361 is caught to be supported on the first plate member 10, and an inner insertion part or pipe 362 is further provided inside the outer supporter 361 and then inserted into a wrinkled conductive resistance sheet 63. A first coupling part 363 is disposed at at least one point of the inside and outside of the inner insertion part 362.

An outer supporter 371 and the inner insertion part 372 are further disposed on the second block 370. A second coupling part 373 is provided at at least one point of the inside and outside of the inner insertion part 372.

The outer supporters 361 and 371 are caught on outer surfaces of the plate members 10 and 20 to seal contact surfaces between the blocks 360 and 370 and the plate members 10 and 20, respectively. Outer surface sealers 365 and 375 may be inserted into the contact surfaces of the blocks 360 and 370 and the plate members 10 and 20 to improve reliability of the sealing operation. Inner surface sealers 364 and 374 may be inserted into contact surfaces of inner surfaces of the outer supporters 361 and 371 and an outer surface of the heat exchange pipeline 117 to prevent a fluid from flowing to the inside and outside of the refrigerator. Each of the inner surface sealers 364 and 374 may have a cross-sectional shape similar to a shape of the outer surface of the heat exchange pipeline 117 to completely perform the sealing operation on the contact surfaces.

Each of the sealers 364, 365, 374, 375 may be made of rubber and provided in a manner in which an object made of an elastic material surrounds the outer surface of the block 360 and/or 370.

The coupling parts 363 and 373 may be provided as coupling units, which are disposed on surfaces corresponding to each other. For example, a female screw or thread and a male screw or thread may be provided to be coupled to each other by rotation thereof. The mutual contact surfaces of the sealers 364, 365, 374, and 375 may be sealed to approach each other by the coupling operation of the coupling parts 363 and 373.

The blocks 360 and 370 may be made of a rubber or plastic material and may not interrupt the action of the thermal conductive resistance of the wrinkled conductive resistance sheet 63. A spacing part between the wrinkled conductive resistance sheet 63 and the blocks 369 and 370 may be empty, or the sealing member 330 may be inserted into the spacing part to resist to the thermal conductive transfer and the flow of the fluid.

Referring to FIG. 28, although each of the blocks 360 and 370 is provided as one body, the two members of the blocks 360 and 370 may be integrated with each other in a state of being separated from each other like the embodiment of FIG. 20. After each of the blocks 360 and 370 is provided as one body, the blocks 370 may be coupled to each other in a state of being coupled to the outer surface of the heat exchange pipeline 117 to complete the coupling of the through sealing part 330.

A direction of an arrow indicates a moving direction and a rotation direction of each of the blocks 360 and 370.

FIGS. 29 to 40 are views illustrating various embodiments in which the heat exchange pipeline is installed according to various refrigerators to which the vacuum adiabatic body is applied. For example, the refrigerator, which is illustrated in FIGS. 10, 12, and 14, has a shape in which a single vacuum adiabatic is partitioned into two storage rooms by a partition wall. Here, cold air is supplied to the two storage rooms by a single evaporator. Hereinafter, an embodiment of the heat exchange pipeline according to various refrigerator types is presented. The configuration of the refrigerator which does not specifically describe the configuration of the refrigerator is assumed to be the same as the description already described.

In FIGS. 29 and 30, a single vacuum adiabatic body 2 provides a single storage room for a refrigerator 1, and the cold air is supplied to the single storage room by the single evaporator.

Referring to FIG. 29, the heat exchange pipeline 117 may be disposed outside the second plate member 20. Thus, the heat exchange pipeline 117 may be thermally insulated by the pipeline adiabatic part 301 and/or the pipeline adiabatic case 301.

A through sealing part 300 through which a refrigerant pipeline connecting the heat exchange pipeline 117 to the evaporator 7 may be provided. A defrosting water pipeline 352 to discharge defrosting water generated during an operation of the evaporator 7 may be further provided in the vacuum adiabatic body in addition to the through sealing part 300.

Referring to FIG. 30, the other parts are the same as those in FIG. 29, and the defrosting water pipeline 352 and the through sealing part 300 are shared. Particularly, not only the refrigerant pipeline passes through the single through sealing part 300 but also passes through the defrosting water pipeline 352.

In this embodiment, since the number of openings defined in the vacuum adiabatic body is reduced, the adiabatic loss may be more reduced, and also, the fear of the vacuum breakage may be reduced.

In this embodiment, since the heat exchange pipeline 117 is disposed in the inner space of the machine room 8 (FIGS. 2 and 16), the space utilization may be more improved, the outer appearance of the refrigerator may be more simplified, and the refrigerator 1 may be reduced in volume.

In FIGS. 31 to 33, a refrigerator 1 providing at least two storage rooms in which a single vacuum adiabatic body 2 is partitioned by a partition wall 350 is provided. An evaporator is provided in each of the storage rooms to supply cold air into the at least two storage rooms.

Referring to FIG. 31, the heat exchange pipeline 117 may be disposed outside the second plate member 20. Thus, the heat exchange pipeline 117 may be thermally insulated by the pipeline adiabatic part 301 and/or the pipeline adiabatic case 301.

A through sealing part 300 through which a refrigerant pipeline connecting the heat exchange pipeline 117 to each of the evaporators 71 and 72 may be provided. A defrosting water pipeline 352 for discharging defrosting water generated during an operation of each of the evaporators 71 and 72 may be further provided in the vacuum adiabatic body in addition to the through sealing part 300. The defrosting water pipeline 352 is configured so that defrosting water generated in the evaporators 71 and 72 flows together.

The two evaporators may be provided to adjust an amount of refrigerant introduced into each of the evaporators 71 and 72 according to capacity that is required for each of the evaporators. For this, a refrigerant distribution part 401 may be provided at a rear end of a condenser 5. The refrigerant distributed in the refrigerant distribution part 401 may be heat-exchanged by the heat exchange pipeline 117 and then introduced into each of the evaporators 71 and 72.

The refrigerant evaporated in the evaporators 71 and 72 may be combined in a refrigerant combining part 402 and then perform heat exchange in the heat exchange pipeline 117. The refrigerant combining part 402 may be provided at any point within the refrigerator 1. Since the inlet pipe 172 constituting the refrigerant combining part 402 has a pipeline having a large diameter, it is not preferable that the two outlet pipes 172 pass through the through sealing part 300 because a cross-sectional area of the through sealing part 300 increases. Thus, the refrigerant combining part 402 may be provided inside the vacuum adiabatic body 2, i.e., at any point within the refrigerator.

On the other hand, since the inlet pipe 171 is a capillary, the two pipelines may pass together through the through sealing part 300. Also, since a separate control of the amount of heat exchange is desired for an individual control of the refrigerant 1, the two inlet pipes may individually pass through the through sealing part 300.

In this embodiment, the refrigerator may be preferably applied when the independent control of the storage rooms is required.

Referring to FIG. 32, this embodiment is different from the foregoing embodiments in that the heat exchange pipeline 117 is disposed inside the partition wall 350, like the embodiment of FIG. 12.

According to this embodiment, in addition to the feature of the embodiment of FIG. 31, it is unnecessary to separately provide the pipeline adiabatic part 301 and the pipeline adiabatic case 302 outside the refrigerator 1. Thus, the outer spaces of the refrigerator 1 may be more efficiently utilized. In addition, since the adiabatic constituents of the partition wall 350 are used together with the adiabatic constituents of the heat exchange pipeline 117, the space utilization of the inner space of the refrigerator 1 may be improved.

In this embodiment, the refrigerant combining part 402 (FIG. 31) may be provided inside the partition wall.

Referring to FIG. 33, this embodiment is different from the foregoing embodiments in that the heat exchange pipeline 117 is disposed inside the machine room 8 (FIG. 16), like the embodiment of FIG. 31. In this embodiment, the refrigerant combining part 402 may be provided in a space within the refrigerator 1.

According to this embodiment, in addition to the feature of the embodiment of FIG. 31, the defrosting water pipeline 352 and the through sealing part 300, which are required for driving the evaporators 71 and 72, may be achieved by a single through-structure. That is to say, two inlet pipes 171, outlet pipes 172, and defrosting water pipelines 352 may pass together through the single through sealing part 300 through which the vacuum adiabatic body passes. Thus, according to another embodiment, since the single through-part 300 sufficiently serves as the through-parts, which are disposed to be spaced apart from each other at two positions, the adiabatic loss may be reduced, and the fear of failure due to the vacuum breakage may be reduced.

In this embodiment, since the heat exchange pipeline 117 is installed in the inner space of the machine room 8 (FIG. 16), the machine room 8 may be efficiently utilized, and the refrigerator 1 may not increase in size, thereby more efficiently utilizing a space outside the refrigerator.

In this embodiment, since the number of openings defined in the vacuum adiabatic body is reduced, the adiabatic loss may be further reduced, and also, the vacuum breakage or a loss of a vacuum state may be reduced.

In FIGS. 34 to 36, a refrigerator 1 providing at least two storage rooms in which a single vacuum adiabatic body 2 is partitioned by a partition wall 35 is provided. An evaporator 71, 72 is provided in each of the storage rooms to supply cold air into the at least two storage rooms. Thus, the refrigerator 1 may have a shape similar to that illustrated in FIGS. 31 and 33. However, the refrigerators are different from each other in that two compressors 501 and 502 are provided to enhance compression efficiency and achieve a higher pressure. Since the two compressors 501 and 502 are provided, it is possible to positively cope with the refrigerant of the two evaporators 71 and 72.

An embodiment of FIGS. 34 to 36 is the same as that of FIGS. 31 to 33 except for a configuration related to a compressor, and thus, the relevant description is applied as it is.

Referring to FIG. 34, the refrigerator 1 according to this embodiment may be preferably applied when an independent control of each of storage rooms is required, and a compressor 501 of a low pressure part and a compressor 502 of a high pressure part are provided in series. The two compressors 501 and 502 may reach a higher pressure and supply sufficient cooling power to the two evaporators 71 and 72.

Referring to FIG. 35, the refrigerator according to this embodiment may have improved space utilization. In addition, the compressor 501 of the low pressure part and the compressor 502 of the high pressure part may be provided in series. The two compressors 501 and 502 may reach a higher pressure and supply sufficient cooling power to the two evaporators 71 and 72.

Referring to FIG. 36, in the refrigerator 1 according to this embodiment, since the number of openings defined in the vacuum adiabatic body 2 is reduced, the adiabatic loss may be more reduced, and also, the fear of the vacuum breakage may be reduced. In addition, the compressor 501 of the low pressure part and the compressor 502 of the high pressure part may be provided in series. The two compressors 501 and 502 may reach a higher pressure and supply sufficient cooling power to the two evaporators 71 and 72.

In FIGS. 37 and 38, a refrigerator 1 having a plurality of single storage rooms constituted by a single vacuum adiabatic body 2 is provided. Here, a single evaporator 7 may supply cool air to each of the corresponding single storage room. In this embodiment, each of the storage rooms may operate in a different thermal state so that the refrigerator 1 operates in various configurations. A refrigerator system illustrated in FIGS. 29 and 30 may be applied in a redundant manner, and thus, the same description will be applied to this embodiment as well.

Referring to FIG. 37, the refrigerator illustrated in FIG. 29 may be viewed as a structure in which the storage rooms of the refrigerator 1 are stacked on both the upper and lower sides. Each of the storage rooms of the refrigerator 1 is provided in different temperature states so as to be adapted for the needs of the consumer.

Referring to FIG. 38, the refrigerator illustrated in FIG. 30 may be viewed as a structure in which the storage rooms of the refrigerator 1 are stacked on both the upper and lower sides. Each of the storage rooms of the refrigerator 1 may be also provided in different temperature states so as to be actively adapted for the needs of the consumer.

The storage rooms of FIGS. 37 and 38 may be used in combination with each other. For example, in one of the refrigerators 1 (FIG. 38), the heat exchange pipeline 117 is located in the machine room 8. In the other refrigerator 1 (FIG. 37), the heat exchange pipeline 117 may be placed on the outer rear surface of the vacuum adiabatic body 117.

In FIG. 39, the refrigerator 1 includes at least two vacuum adiabatic bodies. Each of the at least two vacuum adiabatic bodies or main bodies 601 and 602 provides a storage room. Thus, the refrigerator 1 may include at least two storage rooms. Particularly, this embodiment is different from the foregoing embodiment in that cold air is supplied to all of the at least two storage rooms by a single evaporator 7.

Referring to FIG. 39, a first main body 601 and a second main body 602, which are provided as the vacuum adiabatic bodies, are provided. Each of the main bodies 601 and 620 may be selectively opened and closed by doors 3, respectively.

The necessary constituents for the refrigeration system such as the compressor 4, the condenser 5, the evaporator 7, the heat exchange pipeline 117, and the defrosting water pipeline 352 are provided around the second body 602. The heat exchange pipeline 117 may be withdrawn to the outside by passing through the vacuum adiabatic body 601 and/or 602 through the through sealing part 300. The cold air may be directly supplied from the evaporator 7 to the inside of the second main body 602 the refrigerator.

The first main body 601 and the second main body 602 may communicate with each other by a cold air passage 351. The cold air passage 351 may be provided as two passages for supplying and collecting the cold air to sufficiently supply the cold air. The cold air passage 351 may be provided as a passage that passes through each of the main bodies 601 and 602 and connect the main bodies 601 and 602 to each other.

According to this embodiment, the refrigeration system in which the single heat exchange pipeline 117 is provided may provide cold air to the two vacuum adiabatic bodies 601 and 602. Each of the vacuum adiabatic bodies 601 and 602 provides a storage room, and each of the storage rooms may operate without any temperature interference therebetween.

In the embodiment of FIG. 40, the refrigerator includes at least two vacuum adiabatic bodies 601 and 602. Each of the at least two vacuum adiabatic bodies 601 and 602 provides a storage room. Thus, the refrigerator 1 may include at least two storage rooms. Particularly, this embodiment is different from the foregoing embodiment in that cold air provided in one refrigeration system is supplied to each of the at least two storage rooms by the evaporators 71 and 72. This embodiment is different from the embodiment of FIG. 39 in that an evaporator 71 and 72 is provided in each of storage rooms, and others are the same. Thus, the description of FIG. 39 will be applied as it is without any specific explanation.

Referring to FIG. 40, to supply the refrigerant to the two evaporators 71 and 72, a refrigerant distribution part 401 and a refrigerant combining part 402 are provided. An evaporator 71, 72 is provided inside each of the main bodies 601 and 602 to supply cool air to the corresponding storage room.

A through sealing part 300 may be provided at fixed facing positions of the first main body 601 and the second main body 602 so that the inlet pipe and the outlet pipe connected to the first evaporator 71 pass through the first main body 601 and the second main body 602.

According to this embodiment, the refrigeration system in which the single heat exchange pipeline 117 is provided may provide cold air to the two vacuum adiabatic bodies 601 and 602. Since each of the vacuum adiabatic bodies 601 and 602 not only provides the storage room, but also the evaporator 72, 72 is provided in each of the storage rooms, an influence of the interference of each storage chamber may be removed, and the storage rooms may be completely independently used.

Industrial Applicability

According to the embodiments, when the vacuum adiabatic body is used, since the essentially used heat exchange pipeline is provided in the outer space, which is not related to the vacuum, the interference between the vacuum space part and the heat exchange pipeline may be removed to expect the further effect on the actual commercialization.

In more detail, there are the effects of reducing the heat loss due to the reduction of the number of through-parts, improving the convenience of the work, and reducing the fear of the vacuum breakage.

The invention claimed is:
1. A refrigerator comprising:
at least one main body having a vacuum adiabatic body to define at least one first space configured to store items; and
a door configured to open or close the main body to allow access to the first space from a second space,
a compressor provided in a machine room and configured to compress a refrigerant;
a condenser provided in the second space and configured to condense a compressed refrigerant;
an expansion device configured to expand the condensed refrigerant;
an evaporator provided in the first space and configured to evaporate the expanded refrigerant to dissipate heat; and
at least one refrigerant pipe configured to connect to the evaporator and including a first pipe and second pipe that contact with each other to be heat-exchanged,
wherein the vacuum adiabatic body includes:
a first plate configured to define at least a portion of a wall for the first space;

a second plate configured to define at least a portion of a wall for the second space;
a third space provided between the first and second plates and configured to be a vacuum space;
a support configured to maintain a distance between the first and second plates defining the third space;
an opening provided in at least one of the first plate or the second plate and through which the first and second pipes pass; and
a sealing plug surrounding at least a portion of the first and second pipes and coupled to the first plate or the second plate at the opening, and
wherein a contact surface of the first and second pipes comprises a first part located in the opening, a second part located in the first space, and a third part located in the second space.

2. The refrigerator according to claim 1, wherein an inner surface of the sealing plug supports the first and second pipes, and an outer surface of the sealing plug is supported by the first plate or the second plate at the opening.

3. The refrigerator according to claim 1, further comprising a third plate configured to seal the third space so as to maintain a vacuum state of the third space.

4. The refrigerator according to claim 3, wherein the third plate comprises a conductive resistance sheet having a thin plate shape.

5. The refrigerator according to claim 3, wherein the sealing plug comprises:
a block supported by at least one of the first plate or the second plate; and
a sealer provided in a gap between the block and the third plate.

6. The refrigerator according to claim 5, wherein at least a portion of the block is inserted into an internal space provided by the third plate.

7. The refrigerator according to claim 1, wherein the sealing plug seals between the first space and the second space to prevent cold air of the first space from flowing out of the first space.

8. The refrigerator according to claim 7, wherein the sealing plug comprises:
a first block supported by the first plate; and
a second block supported by the second plate, the second block being coupled to the first block.

9. The refrigerator according to claim 8, further comprising an adhesive configured to couple the first block to the second block and seal the first space and the second space.

10. The refrigerator according to claim 8, wherein the first block and the second block are screw-coupled to each other.

11. The refrigerator according to claim 8, wherein a sealer is provided between the first block and the second block to surround the first and second pipes.

12. The refrigerator according to claim 8, wherein at least one of the first block or the second block includes a first partial block and a second partial block that are formed separately and are coupled to each other to surround the first and second pipes.

13. The refrigerator according to claim 1, further comprising a heat resistance sheet configured to reduce heat transfer between the first plate and the second plate, wherein the first pipe comprises an inlet pipe through which the refrigerant is introduced into the evaporator and the second pipe comprises an outlet pipe through which the refrigerant is discharged from the evaporator, and the inlet and outlet pipes are heat-exchanged with each other.

14. The refrigerator according to claim 1, wherein the sealing plug is made of a material having a thermal conductivity less than that of each of the first plate and the second plate.

15. A vacuum adiabatic body comprising:
a first plate configured to define at least a portion of a wall for a first space and having a first opening;
a second plate configured to define at least a portion of a wall for a second space and having a second opening;
a third space provided between the first and second plates and configured to be a vacuum space;
a support configured to maintain a distance between the first and second plates;
a heat resistance sheet configured to reduce heat transfer between the first plate and the second plate;
at least one refrigerant pipe passing through the first and second openings to allow a refrigerant to move between the first space and the second space, the at least one refrigerant pipe including a first pipe and second pipe that contact with each other to be heat-exchanged; and
a sealing assembly surrounding the first and second pipes and configured to seal the first and second openings so as to prevent fluid communication between the first space and the second space,
wherein a contact surface of the first and second pipes comprises a first part located in the opening, a second part located in the first space and a third part located in the second space.

16. The vacuum adiabatic body according to claim 15, wherein the sealing assembly includes a first block supported by the first plate and a second block supported by the second plate, the first and second blocks being made of a material having a thermal conductivity less than that of each of the first plate and the second plate.

17. The vacuum adiabatic body according to claim 15, wherein the first and second openings face each other.

18. The vacuum adiabatic body according to claim 15, wherein the sealing assembly comprises:
a third plate member configured to seal the third space; and
a block supported by at least one of the first plate or the second plate and made of a material having a thermal conductivity less than that of each of the first plate and the second plate.

19. The vacuum adiabatic body according to claim 15, further comprising a sealant provided between the first and second openings, the sealant configured to be curable after a predetermined time elapses.

20. A refrigerator comprising:
at least one main body having a vacuum adiabatic body to define at least one first space configured to store items; and
a door configured to open or close the main body to allow access to the first space from a second space,
a compressor provided in a machine room to compress a refrigerant;
a condenser provided in the second space to condense a compressed refrigerant;
an expansion device configured to expand the condensed refrigerant;
an evaporator provided in the first space and configured to evaporate the expanded refrigerant to dissipate heat; and
a refrigerant pipe configured to connect to the evaporator, wherein the vacuum adiabatic body includes:
a wall having a first plate and a second plate facing each other in a first direction to create a third space configured to be a vacuum space;
a support configured to maintain a distance between the first and second plates;
an opening provided in at least one of the first plate or the second plate and through which the refrigerant pipe passes,
a sealing plug configured to surround at least a portion of the refrigerant pipe and contacting at least one of the first plate or the second plate, and
wherein the sealing plug comprises:
first and second blocks that are configured to surround a first portion of the refrigerant pipe and are supported by a surface of the first plate; and
third and fourth blocks that are configured to surround a second portion of the refrigerant pipe and are supported by a surface of the second plate.

21. The refrigerator according to claim 20, further comprising a heat resistance sheet configured to reduce heat transfer between the first plate and the second plate;
wherein the first block and the third block are coupled to each other, and the second block and the fourth block are coupled to each other.

22. The refrigerator according to claim 20, wherein the sealing plug is made of a material having a thermal conductivity less than that of each of the first plate and the second plate, and
wherein the sealing plug is configured to prevent fluid communication between the first space and the second space, and the sealing plug spaces the refrigerant pipe apart from the first plate and the second plate.

23. A vacuum adiabatic body comprising:
a first plate;
a second plate;
a vacuum space provided between the first plate and the second plate;
a support configured to maintain a distance between the first plate and second plate, the support being disposed next to or adjacent to the first plate;
at least one sheet configured to reduce heat conduction between the first plate and second plate, the sheet being disposed to be connected with the first plate;
an opening provided in at least one of the first plate or the second plate;
a refrigerant pipe passing through the opening to allow a refrigerant to move; and
a sealing plug surrounding the refrigerant pipe and configured to seal the opening,
wherein the at least one sheet comprises a first sheet and a second sheet that define the opening, and
wherein the sealing plug comprises a first sealer disposed between the first sheet and the refrigerant pipe, and a second sealer disposed between the second sheet and the refrigerant pipe.

24. A vacuum adiabatic body comprising:
a first plate;
a second plate;
a vacuum space provided between the first plate and the second plate;
a support configured to maintain a distance between the first plate and second plate, the support being disposed next to or adjacent to the first plate;
an opening provided in at least one of the first plate or the second plate;
a refrigerant pipe passing through the opening to allow a refrigerant to move; and
a sealing plug surrounding the refrigerant pipe and configured to seal the opening, the sealing plug comprising:
a first block that is supported by the first plate and surrounds a first portion of the refrigerant pipe;
a second block that is supported by the second plate and surrounds a first portion of the refrigerant pipe, the second block being coupled to the first block;
a first sealer disposed between the refrigerant pipe and an inner surface of at least one of the first and second blocks; and
a second sealer disposed between a surface of the first or second plate and an outer surface of at least one of the first and second blocks.

* * * * *